United States Patent [19]

Barney

[11] Patent Number: 4,967,401
[45] Date of Patent: Oct. 30, 1990

[54] METHOD OF ACQUIRING AND INTERPRETING SEISMIC DATA TO OBTAIN LITHOLOGICAL PARAMETERS

[75] Inventor: William M. Barney, Englewood, Colo.

[73] Assignee: Seislith Development, Inc., Denver, Colo.

[21] Appl. No.: 384,510

[22] Filed: Jul. 24, 1989

Related U.S. Application Data

[63] Continuation of Ser. No. 777,939, Sep. 19, 1985, abandoned.

[51] Int. Cl.$^5$ .............................................. G01V 1/28
[52] U.S. Cl. ........................................ 367/46; 367/45; 367/73
[58] Field of Search ...................... 367/45, 46, 73, 52; 364/421

[56] References Cited

U.S. PATENT DOCUMENTS

| | | | |
|---|---|---|---|
| 4,210,968 | 7/1980 | Lindseth | 367/46 |
| 4,316,267 | 2/1982 | Ostrander . | |
| 4,316,268 | 2/1982 | Ostrander . | |
| 4,393,488 | 7/1983 | Gassaway et al. . | |
| 4,397,005 | 8/1983 | Gassaway et al. . | |
| 4,399,525 | 8/1983 | Thompson et al. | 364/421 X |
| 4,534,019 | 8/1985 | Wiggins et al. | 364/421 X |
| 4,554,649 | 11/1985 | Herkenhoff et al. | 364/421 X |
| 4,596,005 | 6/1986 | Frasier | 364/421 X |
| 4,646,239 | 2/1987 | Bodine et al. | 364/421 |
| 4,736,347 | 4/1988 | Goldberg | 364/421 X |

OTHER PUBLICATIONS

"Velocity Determination in a Complex Earth"; William Cray et al., 1983 SEG Convention, Las Vegas, Nev.
"Seismic Refraction Prospecting" Chapter 9, Introduction to Geophysical Prospecting, Third Edition, Milton Dobrin.
"Inverse Convolution Filters"; R. B. Rice, Geophysics, vol. XXVII, No. 1, Feb. 1962, pp. 4–18.
*The Zero-Offset Stack*—Expanded Abstracts of the Technical Program, Society of Exploration Geophysicists 55th Annual International Meeting and Exposition, 1985, pp. 624–625.

Primary Examiner—Thomas H. Tarcza
Assistant Examiner—Tod Swann
Attorney, Agent, or Firm—Beaton & Swanson

[57] ABSTRACT

A method for locating hydrocarbon reservoirs or other geological anomalies by determining lithological parameters including Poisson's ratio, density and seismic wave velocity. Such parameters are determined by quantitatively relating reflection wave amplitude to corrected source-detector offset data.

8 Claims, 22 Drawing Sheets

SHALE
$\nu = 9300$ ft/sec
$\rho = 2.2$ g/cc
$\sigma = 0.308$

POROUS WATER SAND
$\nu = 11240$ ft/sec
$\rho = 2.218$ g/cc
$\sigma = 0.308$

SHALE
$\nu = 9500$ ft/sec
$\rho = 2.2$ g/cc
$\sigma = 0.353$

SHALE
$\nu = 9300$ ft/sec
$\rho = 2.2$ g/cc
$\sigma = 0.333$

NONPOROUS WATER SAND
$\nu = 16130$ ft/sec
$\rho = 2.565$ g/cc
$\sigma = 0.143$

SHALE
$\nu = 9500$ ft/sec
$\rho = 2.2$ g/cc
$\sigma = 0.353$

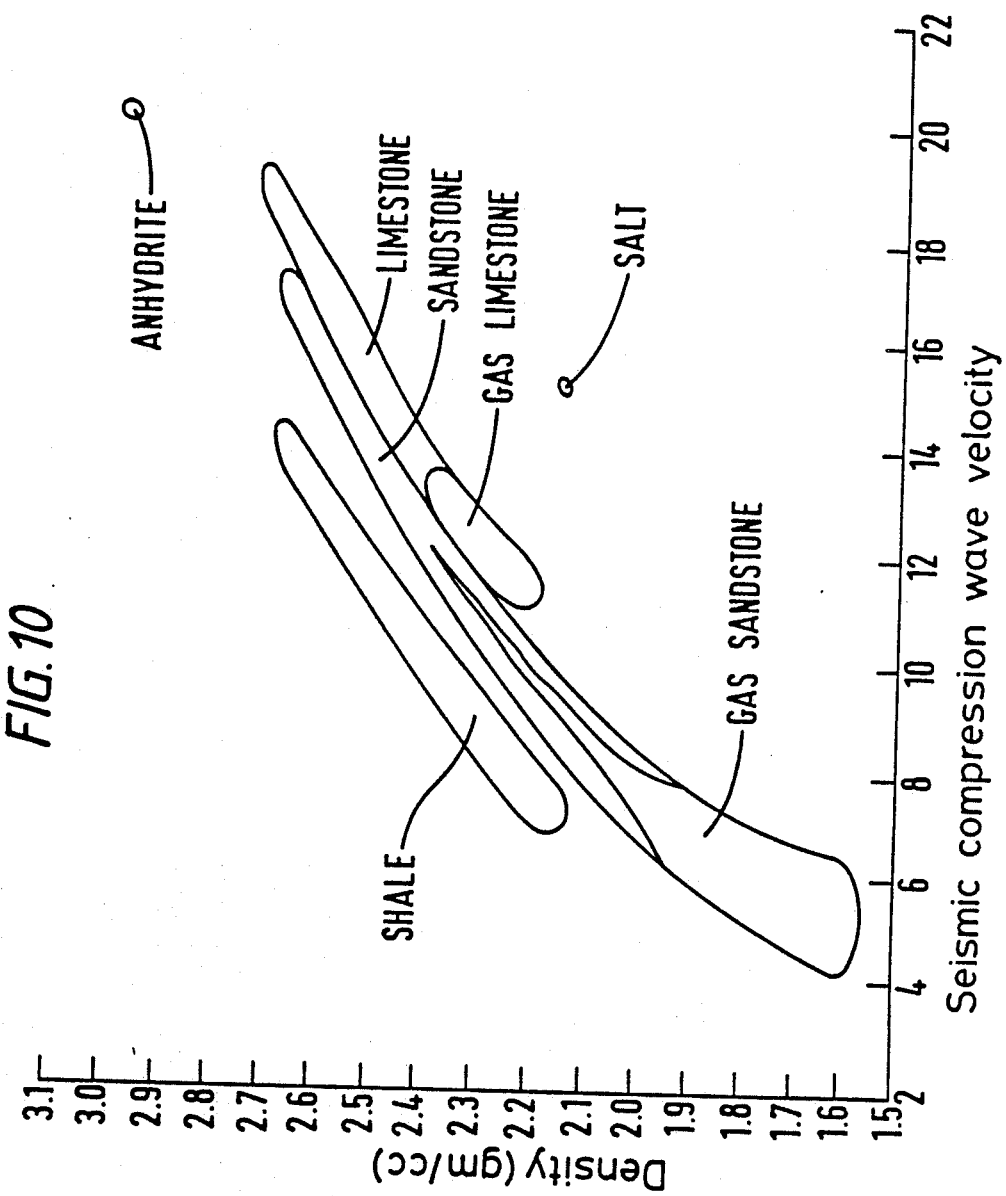

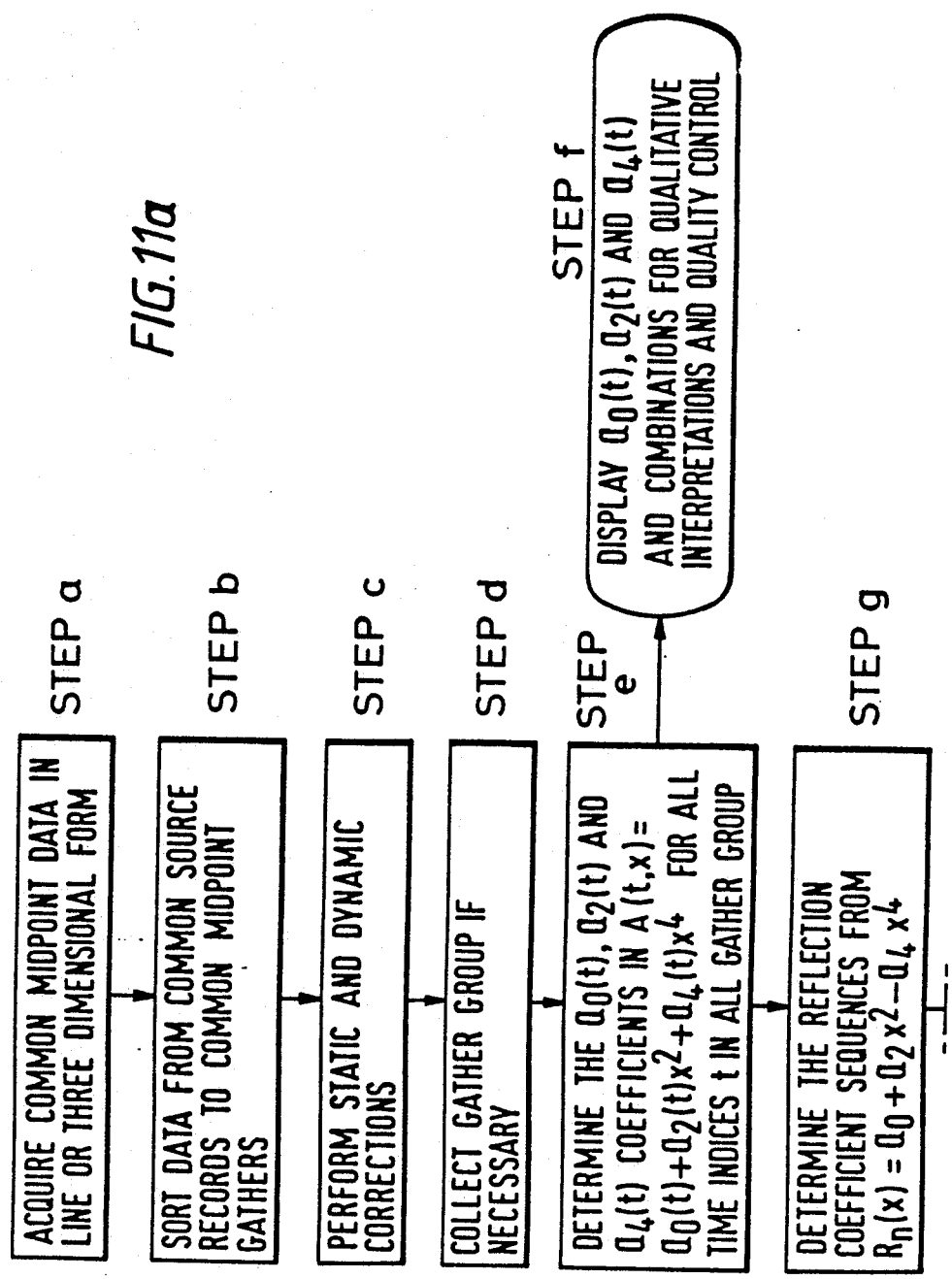

($a_0$)

($a_2$)

(a₄)

METHOD OF ACQUIRING AND INTERPRETING SEISMIC DATA TO OBTAIN LITHOLOGICAL PARAMETERS

This is a continuation of application Ser. No. 777,939, filed on Sep. 19, 1985, now abandoned.

FIELD OF THE INVENTION

This invention pertains to the art of seismic prospecting for hydrocarbon reservoirs or other valuable deposits by common midpoint surveying techniques. In particular, the invention relates to a process for collecting recorded seismic wave amplitudes which are reflected from unknown geological strata and which are associated with one or more common midpoints between seismic source-detector pairs, and converting such recorded amplitudes into estimates of lithological parameters. Such parameters include the variables of Poisson's ratio, material density and seismic wave velocity for one or more geological strata within the ground. Estimates of these parameters for the unknown strata can be compared to the known parameters of known strata in order to predict the lithologic type and the pore fluid or gas content of the unknown strata.

BACKGROUND OF THE INVENTION

Hydrocarbons normally accumulate only in geological formations with certain structural and porosity characteristics that create hydrocarbon reservoirs. For example, a convex porous geological layer underlying a nonporous layer, as in FIG. 1, is an effective structural trap. More common are stratigraphic traps as in FIG. 2 in which a porous inclined reservoir layer is capped on top and at the updip end with an effective sealing rock.

The study of seismic disturbances in the earth, called seismology, has been used for decades in exploring for structural and stratigraphic traps. Exploration by seismology begins by artificially inducing a seismic surface disturbance using explosives, air guns or mechanical vibrators. The resulting seismic waves propagate into the earth and are partially reflected back toward the surface by the interfaces between geological layers. The reflected waves are then sensed and recorded by detectors on the surface at some measured distance from the seismic wave source. The portion of the wave that is reflected is determined by the reflection coefficient of each geological interface, which varies with the variance in the lithological characteristics between the upper and lower layers adjacent to the interface. See generally M.B. Dobrin, *Introduction to Geophysical Prospecting* (1976), the contents of which are incorporated herein by reference.

The seismic waves reflected from various points in a vertical plane through the earth can be displayed side by side as traces on paper to obtain a "seismic section." Early seismologists directly recorded these traces in the field as side by side irregular lines, the length of which was proportional to the depth of the reflecting interfaces. Modern techniques record the reflected waves digitally on magnetic tape or in computer memories. The digitally recorded waves are later statically and dynamically corrected, usually by automated means, and are then displayed side by side for interpretation by a seismologist.

The use of seismology in exploration for hydrocarbons can be divided into the three areas described below: seismic stratigraphy, direct hydrocarbon indicators ("flat spots" and "bright spots") and seismic lithology.

Seismic Stratigraphy. Hydrocarbon reservoirs are commonly found in stratigraphic traps of porous sand or sandstone. It is well known in the art that a deposition of sand is more probable in some environments than in others. For example, beach environments are likely to receive sand depositions. It has been found that some of the environments conducive to sand deposition where hydrocarbon reservoirs may later accumulate are associated with characteristic stratigraphic shapes. Because these sands usually have lithological parameters different from those of adjacent geological layers, the interface between the sand and the adjacent layers will reflect seismic waves. The art of recognizing the characteristic shapes of these sand environments on seismic sections is called "seismic stratigraphy."

A limitation on the value of seismic stratigraphy is that it tells nothing of the actual composition of the geological layers; it simply tells the shape of the layers. Therefore, the interpreter rarely can determine whether a hydrocarbon reservoir actually exists. At the most, he can only recognize geological shapes that experience suggests are more likely than other shapes to be of a composition and structure conducive to hydrocarbon reservoir accumulation.

Direct Hydrocarbon Indicators. Under certain narrow conditions a natural gas charged reservoir will have a high seismic wave reflection coefficient at the top interface between the gas and the cap layer, which will be indicated by an anomalously high reflected wave amplitude. This is often referred to as a "bright spot" on a seismic section. In addition, because the lithological parameters of a gas-charged sandstone reservoir are different from those of a similar water-wet sandstone reservoir, the interface between gas and water at the lower extreme of the gas accumulation may produce another seismic wave reflection anomaly. This is called a "flat spot" on a seismic section. Seismologists have attempted to predict the existence of gas reservoirs by recognizing bright spots and flat spots on seismic sections.

A problem with bright spot and flat spot detection is that only a narrow range of conditions will allow their unambiguous recognition. In some circumstances, the lithological characteristics of layers not containing hydrocarbons can result in interfaces producing bright spots and flat spots. Also, the positioning of the interfaces can focus seismic waves to the surface to simulate bright spots and flat spots.

Seismic Lithology. It has been observed that the seismic reflection amplitude of a given interface varies depending upon distance (called the "offset") between the seismic disturbance source and detector. Those practiced in the art have recently attempted to use this observed variation to help determine hydrocarbon accumulations. This practice of deducing hydrocarbon accumulations from observing variations in reflected wave amplitude with variations in source-detector offset is called "seismic lithology."

One of the earliest documented commercial uses of the seismic lithology technique was in the Sacramento Basin of California in the 1960s. It was found in the Sacramento Basin that certain gas-charged sands were associated with seismic reflection amplitudes that increased with source-detector offset. Because of the Sacramento Basin experience, the industry has generally assumed that an increase in seismic reflection amplitude with increasing offset indicates a gas reservoir. This assumption is incorrect, as demonstrated by numerous field tests of various geological layers. A much more reliable indicator of a gas reservoir is a low Poisson's ratio, which indicates high compressibility. The fallacy of prior art methods relating offset to amplitude is demonstrated in the examples in the following paragraphs, which are from actual wells using mathematically generated seismic data.

FIG. 4 shows the offset amplitude variations for the upper and lower interfaces of a consolidated sand layer between two gassy shale layers. Also shown are the velocity ($v$), density ($\rho$) and Poisson's ratio ($\sigma$) parameters for each layer. In the first two graphs, the consolidated sand is gas-charged. These two graphs show an increase in the absolute magnitude of the wave reflected from the top and bottom interfaces with increasing offset. This is in accordance with general industry assumptions and the Sacramento Basin experience regarding offset-amplitude variations in gas charged sands. However, as the third and fourth graphs of FIG. 4 demonstrate, the offset-amplitude variations caused by a water-wet consolidated sand layer between two gassy shale layers are virtually indistinguishable from those caused by the gas-charged sand layer between two similar gassy shale layers. Therefore, an explorationist merely looking for increasing amplitude with increasing offset in a consolidated sand between gassy shales would be likely to mistake a water-wet sand for a gas-charged sand.

Note that there is a distinct difference in the lithological parameters between the water-wet sand and the gas-charged sand of FIG. 4. In particular, Poisson's ratio is much lower in the gas-charged sand than in the water-wet sand. An explorationist equipped with knowledge of those lithological parameters could correctly determine the composition of the tested layers.

The example described in FIG. 5 demonstrate that the offset-amplitude variations of a gas sand layer between two shale layers depends on the consolidation of the gas sand layer. The first two graphs of FIG. 5 show, in the case of a partially consolidated sand, a decrease in the absolute magnitude of the wave reflected from the top and bottom interfaces with increasing offset. However, the third and fourth graphs in FIG. 5 show the opposite result in the case of an unconsolidated sand, also gas charged. Thus, the explorationist looking for amplitude increasing with offset could be led away from the valuable partially consolidated gas-charged sand shown in the first two graphs. An explorationist with knowledge of the lithological parameters of the layers would not make this mistake; both the consolidated and unconsolidated gas sands have low Poisson's ratios indicating high compressibility.

FIG. 6 shows dramatic offset-amplitude variations in porous and nonporous water sand layers between two shale layers. These variations could incorrectly be interpreted as hydrocarbon indicators under methods of the prior art. However, knowledge of the lithological parameters would disprove the existence of hydrocarbons; both the porous and non-porous layers have Poisson's ratios that are too high for a gas reservoir.

FIG. 7 shows offset-amplitude variations that are exactly the opposite of the variations that would be expected under the prior art. The first two graphs of FIG. 7 show only slight offset-amplitude variations for a gas sand between two shales, which would lead explorationists using prior art methods to incorrectly conclude that no hydrocarbons were present. In the third and fourth graphs of FIG. 7, a water-wet sand between two shales shows dramatic offset-amplitude variations, which would lead an explorationist using prior art methods to conclude incorrectly that hydrocarbons were present. Again, both mistakes could be avoided with knowledge of Poisson's ratio for the layers. The gas sand shows a low Poisson's ratio indicating high compressibility, while the water-wet sand shows a high Poisson's ratio indicating low compressibility.

A few practitioners have recognized that, contrary to industry assumptions, the amplitudes of seismic waves reflected from hydrocarbon reservoir interfaces do not necessarily increase with increasing offset. However, the techniques of those practitioners are largely empirical and they have not achieved the breakthrough quantitative process of this invention. For example, in U.S. Pat. No. 4,316,268, Ostrander for Method for Interpretation of Seismic Records to Yield Indication of Gaseous Hydrocarbons, it is stated that the reflected wave amplitude increases with increasing offset in the case of shale overlying gas sands, and decreases with increasing offset in the case of shale overlying gas limestone. Such an approach, of course, requires knowledge of the properties of the overlying layer, which is usually no more available than knowledge of the properties of the underlying layer. Moreover, it is not applicable to the large majority of circumstances in which the offset-amplitude variation does not fit the offset-amplitude variation of shale overlying gas sands, shale overlying gas limestone or some other known layer series. Finally, it usually does not apply to oil exploration, but only to gas exploration in which offset-amplitude variations are likely to be dramatic.

Rather than simply comparing observed offset-amplitude variations of unknown layer series with the offset-amplitude variations of known layer series, the industry has long struggled to develop a quantified method that would use the offset-amplitude variation to determine the distinctive lithological parameters of the geological layers. A principal obstacle to such a quantified approach has been that the theoretical relationships defining offset and amplitude as a function of the lithological parameters are extraordinarily complex. An added complexity arises because the mathematical equations on the subject express the reflection coefficient as a function of the angle of incidence of a seismic wave on a reflecting interface within the ground. This angle of incidence changes instantaneously at each layer interface in accordance with Snells Law, which states $p = \sin\theta i / vi$, in which p is a constant for a given wave called the ray parameter, $\theta i$ is the angle of incidence of the wave and vi is the velocity of the wave. Because the wave velocity varies in each layer, the angle of incidence also varies.

Some practitioners attempt to relate the angle of incidence to the measured source-detector offset by assuming that the angle of incidence can be expressed as a simple trigonometric function of the offset and the depth of the interface. However, this is extremely rough and often misleading because the seismic wave path typically assumes a zigzag pattern rather than a line or some other path easily expressable as a function of depth and offset.

A more sophisticated approach used by some practitioners for determining the angle of incidence is through "forward modeling," which is a trial and error technique for fitting the observed amplitude variations with estimated angles of incidence through each interface down to the interface in question. The limitations of this technique are obvious, given that there may be dozens of interfaces between the surface and the interface in question and that the angle of incidence is only one of several independent variables affecting the amplitude variations.

This invention avoids the necessity of estimating the angles of incidence. Instead, it provides a practical and fully automated means to use seismic data for determining with surprising accuracy the subsurface lithological parameters of Poisson's ratio, seismic wave velocity and material density. From these parameters, the actual composition of the geological parameters can be accurately predicted.

SUMMARY OF THE INVENTION

This invention is a process for determining the presence of hydrocarbon reservoirs by interpretation of variations in amplitude of seismic reflection events relative to variations in source-detector offset. Seismic data traces from the field are collected and recorded through roll-along or other techniques in two or three dimensional surveying and are indexed by detector ground locations, offsets, common source excitations and common midpoints. The statically and dynamically corrected data are used to relate amplitude variations to offset variations through the variations in quantified lithological parameters in adjacent geological layers, such as Poisson's ratio, material density and seismic wave velocity. Thus, the invention enables the explorationist to use knowledge of the lithology of any geological layer to determine the lithology of an adjacent layer, which in turn may be used to determine the lithology of the next adjacent layer, and so on. The lithological parameters so determined for unknown layers are then matched with the known lithological parameters of various types of known geological layers to determine accurately the actual composition of the layer in question.

In a variation of the invention, side by side traces are displayed that are functions of the reflected seismic wave amplitude corrected for seismic wave angle of incidence variations. The seismologist then interprets these corrected traces. As a further variation, poor signal-to-noise ratio data from two or more adjacent common midpoint gathers can be used together for determining the lithological parameters and corrected offset amplitude variations. The combined use of two or more common midpoint gathers in this manner may improve the signal-to-noise ratio of the data.

BRIEF DESCRIPTION OF THE DRAWINGS

FIGS. 9 and 10 show a few of the well known relationships between lithologic type and the lithological parameters of velocity, density and Poisson's ratio.

DESCRIPTION OF THE PREFERRED EMBODIMENT

Figure 1:
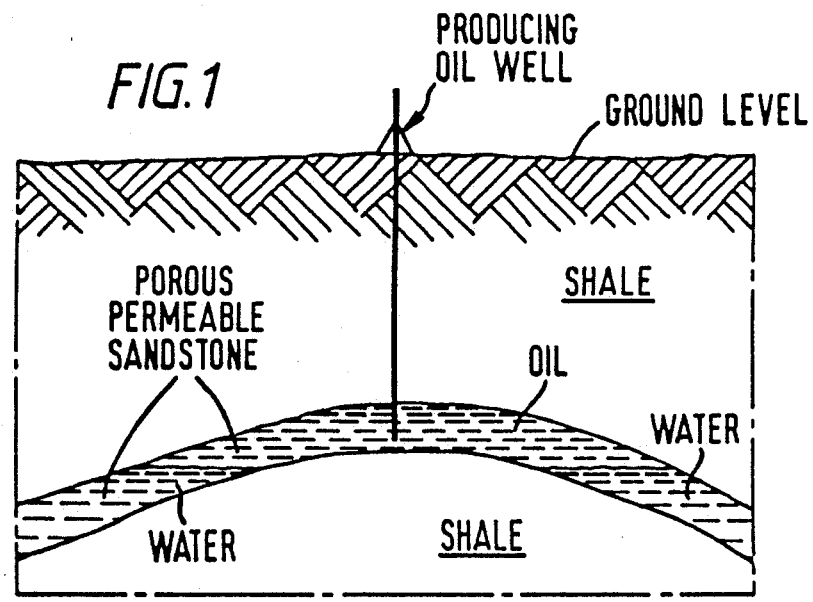
FIGS. 1 and 2 are cross sections through typical structural and stratigraphic hydrocarbon reservoirs.
Figure 2:
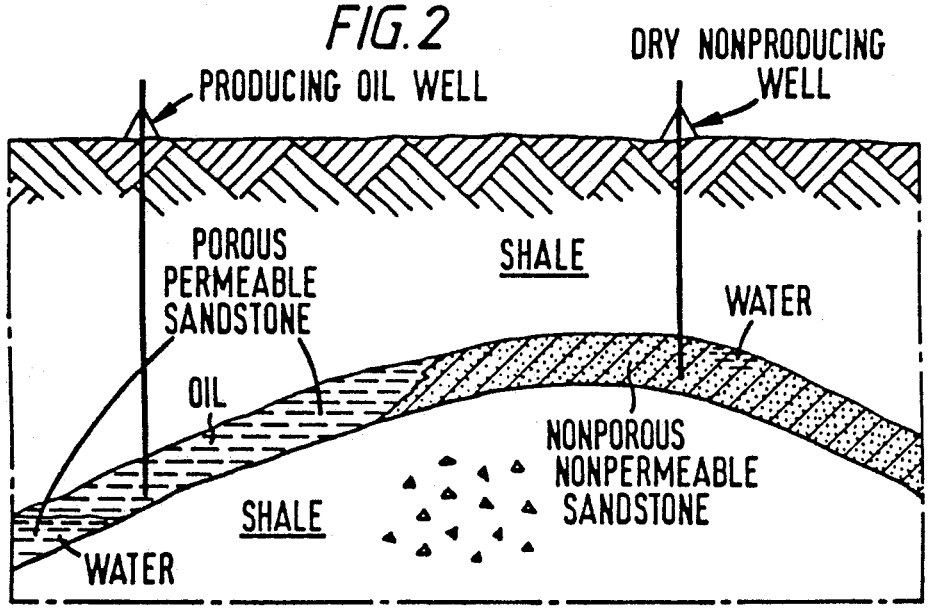

Certain terms used in the mathematical discussions and elsewhere in this application are defined as follows:

acoustic dependance zi—the product of compression p wave velocity and density in the interval i. $z_i = v_i \rho_i$ amplitude Ai(x)—the amplitude of a seismic wave. The amplitude can be obtained by convolving the source wavelet with the reflection coefficient series.

angle of incidence $\theta$—the angle between a particular ray and the normal (perpendicular) to a particular interface. $\theta$ = the angle at the ith interface.

array—one or more sources or detectors operating in common with an effect assigned to a specific horizontal location.

arrival time Ti(x)—the time required for a seismic compression wave to travel from the source to the ith interface and return to a detector at an offset equal to x.

common midpoint—a midpoint common to two or more source-detector pairs.

common midpoint surveying—the process whereby the locations of sources and detectors are arranged so that when a source is excited at a particular location and the resultant reflections are recorded at a number of detectors simultaneously, one or more of these source-detector pairs will have midpoints common to source detector pairs of another source-detector arrangement used.

density $\rho i$—the density of the material in a particular layer. $\rho_i$ = density of the ith layer.

interval thickness di—the thickness of a particular layer. $d_i$ = thickness of the ith layer.

interval time ti—the total time a normally incident seismic wave requires to pass through a particular layer on the way down to and back from a reflecting interface. ti=interval time of the ith layer=2di/vi.

interval velocity vi—the velocity of seismic compression waves in a particular layer. vi=interval velocity in the ith layer.

line surveying—a common midpoint survey wherein the common midpoints lie along a line on the surface. A line survey allows geologic inference along a vertical plane beneath the line of survey.

midpoint—the surface location midway between a particular source-detector pair.

moveout $\Delta Ti(x)$—the difference between arrival time and reflection time. $\Delta Ti(x)=Ti(x)-Ti$.

offset x—the horizontal distance between the seismic source and the detector.

Poisson's ratio $\sigma i$—a measure of the compressibility of the ith layer. A compressible material (gas, for instance) has a low Poisson's ratio while an incompressible material (water, for instance) has a high Poisson's ratio. $\sigma i=(\gamma i^2-2)/2(\gamma i^2-1)$.

ray—the path of seismic energy from a particular source array down to a reflecting interface and then up to a particular detector array.

ray parameter p—Snells Law states that p is a constant for a particular ray. $p=\sin\theta i/vi$.

reflecting interface or interfaces—the boundary between two layers with differing lithological properties such that part of the seismic wave is reflected. The ith reflecting interface is at the base of the ith layer.

reflection coefficient Ri—the amplitude ratio of the incident compression wave to the reflected compression wave at the ith interface.

$Ri(\theta)$ is the reflection coefficient for a wave with an angle of incidence $\theta$.

$Ri(x)$ is the reflection coefficient for a wave reflected from the ith interface and detected at offset x. Under this invention $Ri(x)=rA0+rA2x^2+rA4x^4$.

reflection time Ti—the time required for a normally incident compression wave to travel to the ith interface and return.

reservoir—a rock with a sufficient content of interconnected pore space to deliver commercial quantities of hydrocarbons to a producing well.

root mean square velocity Vi—an effective velocity for P waves traveling from the source to the detectors.

$$Vi = \sqrt{\sum_{j=0}^{i} vi^2 tj^2/Ti}$$

sample interval—the time interval between successive recorded measurements (samples) of the output from a detector. In seismic recording, sample intervals of 1, 2, or 4 milliseconds are common. The seismic trace from a particular detector may be represented in a memory device such as magnetic tape or the memory section of an electronic computer as a sequence of numbers, each representing the voltage output of a detector at successive times and each separated by the sample interval.

shear wave velocity (wi)—the velocity of seismic shear waves in the ith layer.

sorting—the process of regrouping the recorded data so that all data with common midpoints are identified with a common index to facilitate automated analysis of data grouped by common midpoint. Such a grouping is called a common midpoint gather.

stacked seismic section or common midpoint stack or common depth point stack—a side-by-side display of a sequence of adjacent stacked traces.

stacking—the procedure whereby traces from a number of offsets with a common midpoint are added together after correction for moveout to produce one stacked trace.

three dimensional survey—a common midpoint survey wherein the common midpoints lie within an area with length and breadth, thus allowing geologic inference with a three dimensional volume below the area incompassing the common midpoints.

time index—the indexing number to identify all data that have a particular time parameter in common.

velocity ratio $\gamma i$—the ratio of compression wave velocity to shear wave velocity in the ith layer. $\gamma i=vi/wi$ Certain published studies may provide useful additional background material for the scientific bases and other aspects of the invention, the contents of which are incorporated herein by reference.

Blut, H., 1932a, Ein Beitrag zur Theory der Reflexion and Berchung elastischer Wellen an Unstetigkeitsflachen: Zeitschr. f. Geophysik, VIII, 130–144.

Blut, H., Ein Beitrag zur Theory der Reflexion and Brechung elastischer Wellen an Unstetigkeitsflachen: Zeitschr. f. Geophysik, VIII, 305–322.

Bortfeld, R., 1961, Approximations to the reflection and transmission coefficients of plan longitudinal and transverse waves: Geophys. Prosp., v. 9, p. 485–502.

Conte, Samuel D. and deBoor, Carl, Elementary Numerical Analysis §6.3 1980.

Domenico, S. N., 1977, Elastic properties of unconsolidated sand reservoirs: Geophysics, v. 42, no. 7, p. 1339–1368.

Gassaway, G. S., and H. J. Richgels, 1983, SAMPLE: Seismic amplitude measurement for primary lithology estimation: in expanded abstracts of technical program, Tulsa, SEG. p. 610–613.

Graul, M , F. Hilterman, W. Ostrander, D. Price and L. Wood, 1983, Seismic Lithology: SEG Continuing Education Course manual: Tulsa, SEG.

Knott, C. G., 1899, Reflection and refraction of elastic waves, with seismological applications. *Phil. Mag.*, 5th ser. v. 48, 64–97.

Koefoed, O., 1955, On the effect of Poisson's ratios of rock strata on the reflection coefficients of planewaves: Geophys. Prosp., v. 3, p. 381–387.

Mann, R. L., and I. Fatt, 1960, Effects of pore fluids on Elastic properties of sandstones: Geophysics, v. 25, p. 433–444.

Muskat, M. and M. W. Meres, 1940a, Reflection and Transmitsion Coefficients for Plane Waves in Elastic Media: Geophysics, v. 5, p. 115–148.

Muskat, M. and M. W. Meres, 1940b, The Seismic Wave Energy Reflected from Various Types of Stratified Horizons: Geophysics, v. 5, 149–155.

Oldenberg, D. N., T. Scheuer, and S. Levy, 1983, Recovery of acoustic impedance from reflection seismograms: Geophysics, v. 48, p. 1318–1337.

Ostrander, W. J., 1982, Plane wave reflection coefficients for gas sands at nonnormal angles of incidence: in Expanded abstracts of technical program, Tulsa, SEG, p. 216–218.

Payton, C.E. (ed.), 1977, Seismic stratigraphy—applications to hydrocarbon exploration; AAPG memoir 26: Tulsa, AAPG.

Picket, G.R., 1963, Acoustic character logs and their applications in formation evaluation: J. of Peter. Tech. June, p. 659–667.

Schlichter, L. B. and V. G. Gabriel, 1933, Studies in Reflected Seismic Waves: Gerl. Beitrage z. Geophysik, v. 38, p. 228–238.

Shuey, R. T., 1985, A simplification of the Zoeppritz equations: Geophysics, v. 50, p. 609–614.

Slotnick, M. M., 1959, Lessons in seismic computing: Tulsa, SEG, p. 194.

Taner, M. T. and F. Koehler, 1969, Velocity spectra-digital computer derivation and applications of velocity functions: Geophysics, v. 34, p. 859–881.

Tathan R. H., and P. L. Stoffe, 1976, Vp/Vs—A potential hydrocarbon indicator: Geophysics, v. 41, no. 5, p. 837–849.

Van Der Knapp, W., 1951, Nonlinear behavior of elastic porous media: Trans. AIME, v. 126, p. 179–186.

Walker, C. and T. J. Ulrych, 1983, Auto-regressive recovery of the acoustic impedance, Geophysics, v. 48, p. 1338–1350.

The following discussion of the mathematical and theoretical bases for the invention is beneficial to fully appreciate its significance. References are to the above published studies.

As indicated above, theoretical studies have expressed the reflection coefficient of a geological interface as a function of the angle of incidence of a seismic wave. These studies were begun by Knott (1899) and Zoeppritz (1919) who expressed the relationships in the form of matrix equations containing Poisson's ratio, seismic wave velocity and other variables. Koefoed (1955) demonstrated that significant variations in the interface reflection coefficient results if both Poisson's ratio and velocity are allowed to vary between the layers adjacent to the interface. Much later, Bortfeld (1961) demonstrated that the Zoeppritz matrix equations can be approximated in a much simpler form, thus providing explorationists a theoretical framework for using offset amplitude variations to explore for hydrocarbons. Recently, Shuey (1985) has provided another useful approximation.

As discussed above, the procedures currently applied are limited by the fact that the offset dependent variable in the theoretical formulations is the angle of incidence, which changes at each interface and is therefore very difficult to determine after several interfaces. Practitioners attempt to overcome this limitation by introducing error prone simplifying assumptions regarding the angle of incidence or by relying on trial and error forward modeling of the offset-amplitude relationships based on either the Zoeppritz equations or Bortfeld's approximation. In forward modeling, the model parameters are iterated until a fit with observed data is obtained. Because the angle of incidence changes at each interface, successive iterations require successive trial and error passes of ray tracing to relate the angle of incidence to the measured offset. This invention eliminates the necessity for estimating the angle of incidence through simplifying assumptions or forward modeling.

Figure 3:
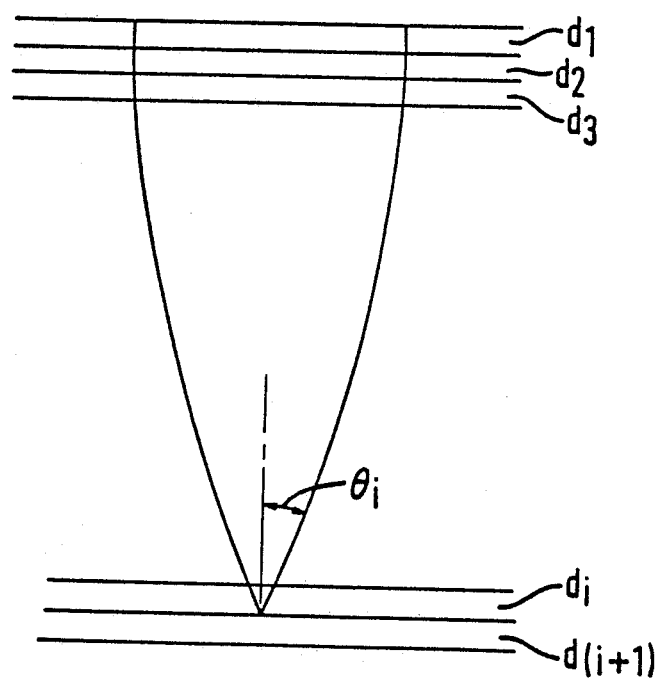
FIG. 3 shows the layered model of the earth with interval thicknesses d1 through d(n+1) and corresponding lithological parameters in the notation of the list of definitions. Also shown is a typical geometry of the seismic ray paths through the layers.
Figure 4:
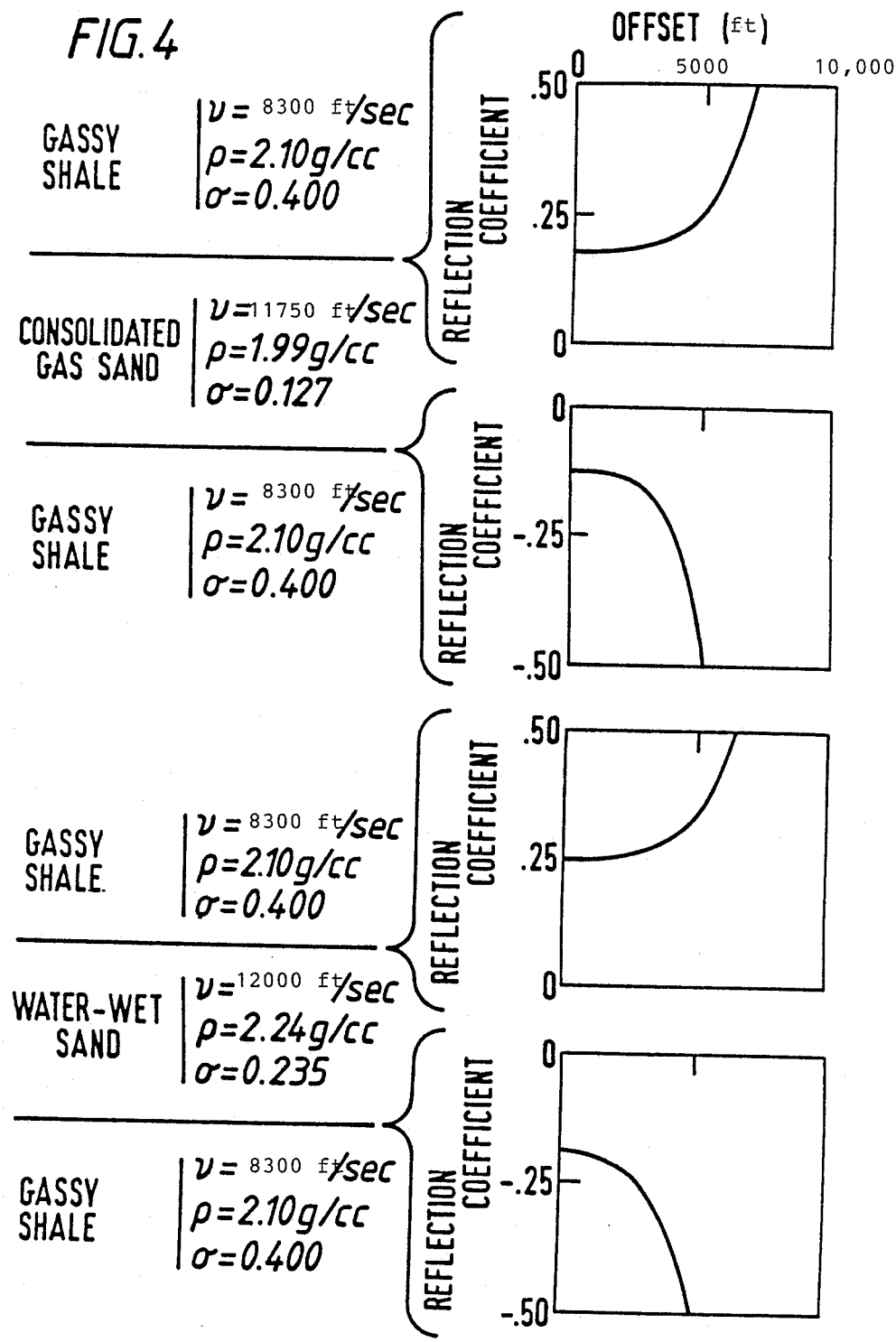
FIGS. 4 through 7 show a series of offset-amplitude responses for gaseous and nongaseous, consolidated and unconsolidated, and porous and nonporous reservoirs. These figures demonstrate that the progressive change in the amplitude of a reflection in and of itself is not an indicator of gas in a reservoir rock. The only valid indicator of gas in a reservoir is a low Poisson's ratio, the provision of which is a value of the invention described herein.
Figure 5:
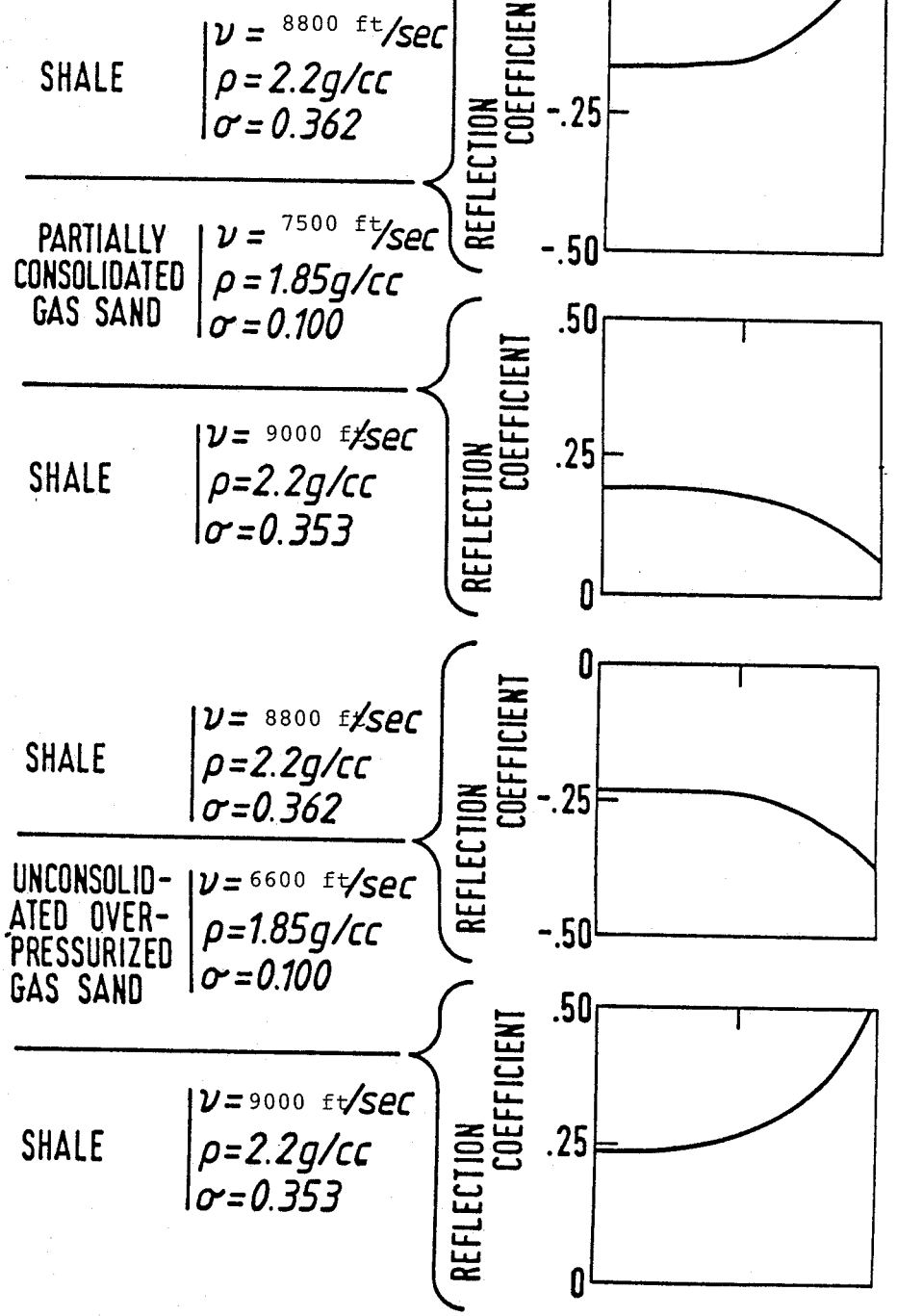
Figure 6:
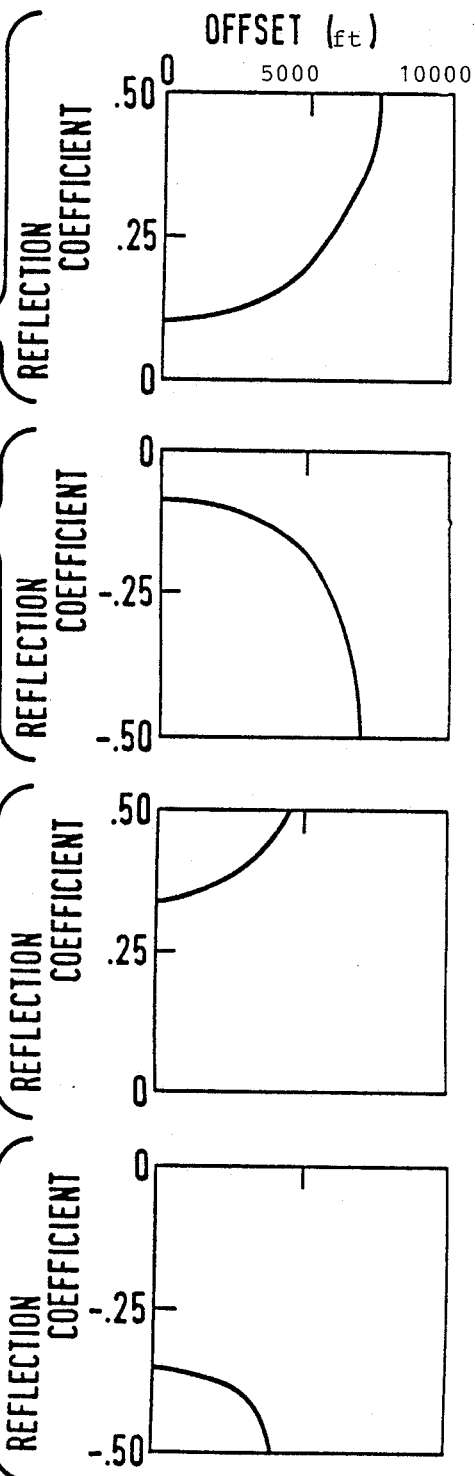
Figure 7:
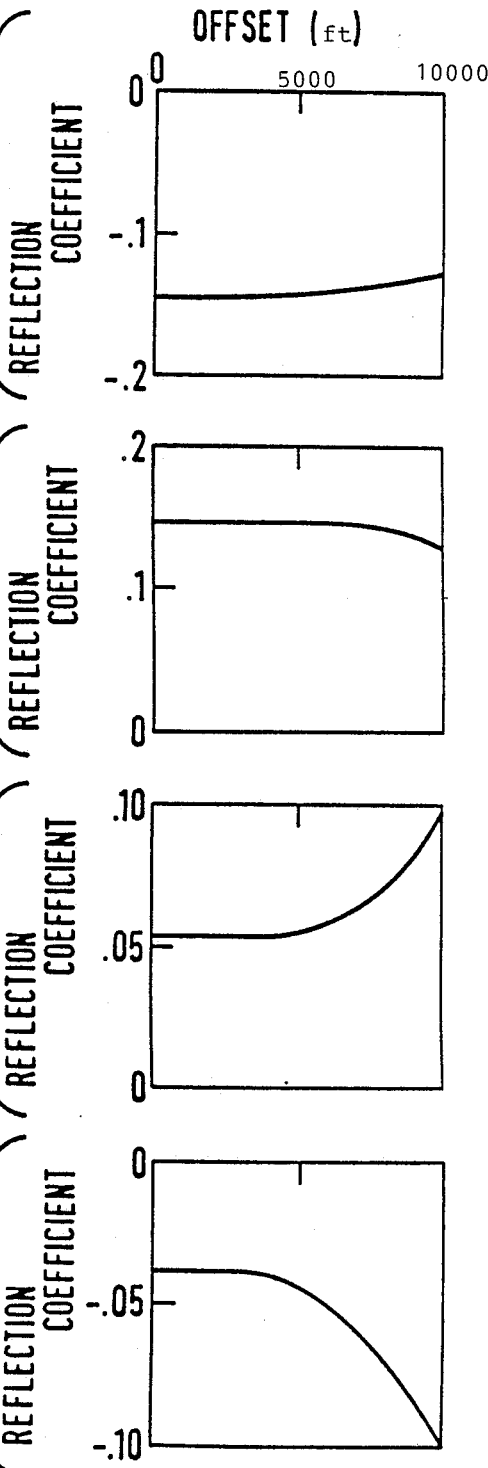

The following paragraphs set forth the theoretical basis for the novel process of the invention. The sequence below starts with Bortfeld's approximation to the Zoeppritz equations, with reference to the parallel plane layer geometry shown in FIG. 3. The Bortfeld approximations assume relatively small changes in the lithologic parameters of the Zoeppritz equations. As will be apparent to those skilled in the art, the Zoeppritz equations themselves or any other approximation (such as those shown by Shuey) in combination with the invention may produce equivalent results. Bortfeld's approximation for the reflection coefficient at the with interface can be written:

$$Ri(\theta) = \frac{1}{2} \ln \frac{z(i+1)\cos\theta i}{zi\cos\theta(i+1)} + \left(\frac{\sin\theta i}{vi}\right)^2 \left[\left(\frac{vi}{\gamma i}\right)^2 - \left(\frac{v(i+1)}{\gamma(i+1)}\right)^2\right] \left[2 + \frac{\ln\frac{p(i+1)}{pi}}{\ln\frac{v(i+1)\gamma i}{vi\gamma(i+1)}}\right] \quad (1)$$

As noted above and in the list of definitions, Snells Law relates the angle of incidence $\theta i$ to the wave velocity $vi$ through the ray parameter p. After expressing $\sin\theta$ and $\cos\theta$ in terms of the ray parameter through Snells Law, Equation (1) becomes $$Ri(p) = \frac{1}{2} \ln \frac{z(i+1)}{zi} + \frac{1}{4} \ln \frac{1-p^2 vi^2}{1-p^2 v(i+1)^2} + \quad (2)$$

$$p^2 \left[\left(\frac{vi^2}{\gamma i^2}\right) - \left(\frac{v(i+1)}{\gamma(i+1)}\right)^2\right] \left[2 + \frac{\ln\frac{p(i+1)}{pi}}{\ln\frac{v(i+1)\gamma i}{vi\gamma(i+1)}}\right]$$

It is noted that, in general, a term of the form $$\ln(1-y)$$

can be expanded in powers of y to equal $$-\left[y + \frac{y^2}{2} + \frac{y^3}{3} + \frac{y^4}{4} + \frac{y^5}{5} + \ldots\right]$$

In addition, a term of the form $$\ln \frac{y}{u} \text{ equals } \ln y - \ln u$$

Therefore, the term $$\ln \frac{1-p^2 vi^2}{1-p^2 v(i+1)^2}$$

can be expanded in powers of p to equal $$p^2 (v(i+1)^2 - vi^2) + \frac{p^4}{2}(v(i+1)^4 - vi^4) +$$

$$\frac{p^6}{3}(v(i+1)^6 - vi^6) + \ldots$$

Substituting the expanded term into Equation (2) results in $$Ri(p) = \frac{1}{2} \ln \frac{z(i+1)}{zi} + \left[\frac{v(i+1)^2 - vi^2}{4} + \quad (3)\right.$$

$$\left(\frac{vi^2}{\gamma i^2} - \frac{v(i+1)^2}{\gamma(i+1)^2}\right)\left[2 + \frac{\ln\frac{p(i+1)}{pi}}{\ln\frac{v(i+1)\gamma i}{vi\gamma(i+1)}}\right]p^2 +$$

$$\frac{v(i+1)^4 - vi^4}{8}p^2 + \frac{v(i+1)^6 - vi^6}{12}p^2 + \ldots$$

The ray parameter p may be expressed in terms of offset by reference to the appendix of Taner and Koehler (1969). There, they show that the offset equation from Slotnik's (1959) pair of parametric equations for offset and reflection time, restated here in Equation (4), $$x = 2p \sum_{k=1}^{i} \frac{vkdk}{\sqrt{1 - p^2 vk^2}} \quad (4a)$$

$$Ti(x) = 2 \sum_{k=1}^{i} \frac{dk/vk}{\sqrt{1 - p^2 vk^2}} \quad (4b)$$

can be expressed as $$x = \left(2\sum_{j=1}^{i} vj^2 tj\right)p + \left(\sum_{j=1}^{i} vj^4 kj\right)p^3 + \left(\tfrac{3}{4}\sum_{j=1}^{i} vj^6 tj\right)p^5 + \ldots \quad (5)$$

It is noted that, in general, a power series of the form $$x = op + cp^3 + ep^5 + \ldots$$

can be inverted to be expressed as $$p = Ax + Cx^3 + Ex^5 + \ldots \text{ where}$$

$$A = \frac{1}{a}; \quad C = \frac{-c}{a^4}; \text{ and } E = \frac{1}{a^4}(3a^2c^2 - a^3e)$$

Therefore, the above power series may be inverted to express p as a function of x so that $$p = b_1 x + b_3 x^3 + b_5 x^5 + \ldots \quad (6)$$

After substituting Equation (6) into Equation (5) and equating like powers of x to evaluate the coefficients, Equation (6) becomes $$p = \frac{x}{2\sum_{j=1}^{i} vj^2 tj} - \left[\frac{\sum_{j=1}^{i} Vj^4 tj}{\left(2\sum_{j=1}^{i} vj^2 tj\right)^4}\right]x^3 + $$

$$\frac{3}{\left(2\sum_{j=1}^{i} vj^2 tj\right)^6}\left[\frac{\left(\sum_{j=1}^{i} vj^4 tj\right)^2}{2\sum_{j=1}^{i} vj^2 tj} - \frac{\sum_{j=1}^{i} vj^6 tj}{4}\right]x^5 + \ldots \quad (7)$$

Substituting Equation (7) into Equation (3) and retaining terms through $x^4$, we have an expression for the reflection coefficient as a function of x, $$Ra(x) = a0 + a2x^2 + a4x^4 \quad (7a)$$

where $$a0 = \frac{1}{2}\ln\frac{z(i+1)}{zi} = \frac{1}{2}\ln\frac{v(i+1)p(i+1)}{vipi} \quad (7b)$$

$$a2 = \left[\frac{1}{4}(v(i+1)^2 - vi^2) - \left(\frac{v(i+1)^2}{\gamma(i+1)^2} - \right.\right. \quad (7c)$$

$$\left.\left.\frac{vi^2}{\gamma i^2}\right)\left(2 + \frac{\ln\frac{p(i+1)}{pi}}{\ln\frac{v(i+1)\gamma i}{vi\gamma(i+1)}}\right)\right](Vi^2 Ti)^{-2}$$

$$a4 = \left[\frac{1}{8}v(i+1)^4 - vi^4 - a2(vi^2 Ti)\left(2\sum_{j=1}^{i} vj^4 tj\right)\right](Vi^2 Ti)^{-4} \quad (7d)$$

Additional precision is possible by retaining additional terms of the power series, but such precision is seldom necessary. While equation (7) is useful for forward models of offset-amplitude variation, it can be cast in a more useful form for estimating differences in lithological parameters by introducing the approximations $$\frac{p(i+1) - pi}{pi} = \ln\frac{p(i+1)}{pi}$$

$$\frac{v(i+1) - vi}{vi} = \ln\frac{v(i+1)}{vi}$$

$$\frac{\gamma(i+1) - \gamma i}{\gamma i} = \ln\frac{\gamma(i+1)}{\gamma i}$$

so that:

$$a0 = \frac{1}{2}\left(\frac{p(i+1) - pi}{pi} + \frac{v(i+1) - vi}{vi}\right) \quad 8(a)$$

$$a2 = \frac{vi^2}{\gamma i^2}\left[\left(\frac{vi^2 - 4}{2}\right)\left(\frac{v(i+1) - vi}{vi}\right) - \right. \quad 8(b)$$

$$\left. 4a0 + 4\left(\frac{\gamma(i+1) - \gamma i}{\gamma i}\right)\right](Vi^2 Ti)^{-2}$$

$$a4 = \left[-\frac{vi^4}{2}\left(\frac{v(i+1) - vi}{vi}\right) - \right. \quad 8(c)$$

$$\left. a2(vi^2 Ti)\left(2\sum_{j=1}^{i} vj^4 tj\right)\right](Vi^2 Ti)^{-4}$$

Equations 8 can be solved to yield expressions relating Poisson's ration, velocity and density of a given layer to Poisson's ration, velocity and density of the overlying layer, as follows $$\frac{v(i+1) - vi}{vi} = \quad (9a)$$

$$\frac{2}{vi^4}\left[\left(2a2\sum_{j=1}^{i} vj^4 tj\right)(Vi^2 Ti) + a4(Vi^2 Ti)^4\right]$$

$$\frac{p(i+1) - pi}{pi} = 2a0 - \frac{v(i+1) - vi}{vi} \quad (9b)$$

$$\frac{\gamma(i+1) - \gamma i}{\gamma i} = a0 + \frac{1}{4}\frac{\gamma i^2}{vi^2}(Vi^2 Ti)a0 - \quad (9c)$$

$$\frac{1}{4}\left(\frac{\gamma i^2}{2} - 2\right)\left(\frac{v(i+1) - vi}{vi}\right)$$

Equations 8 and 9 are valuable because they relate the lithological parameters of velocity, Poisson's ratio and density of each layer to the same lithological parameters of the overlying layer and to a set of constants. The constants can be determined through equation 7(a) by relating the statistically and dynamically corrected seismic data of a common midpoint to several offsets. The lithological parameters of the overlying layer can be determined through knowledge of the local geology, through drilling a well or through successive application of the invention for each overlying layer starting with the surface layer or some other layer the lithology of which is known. Application of Gardner's Rule, stating that $\rho = (0.23)v^{0.25}$ or other approximations known in the art relating Poisson's ratio, velocity and density may also be helpful. Thus, once the values of Poisson's ratio, velocity and density are known for any layer, those values can be determined for the successive layer.

Figure 11B:
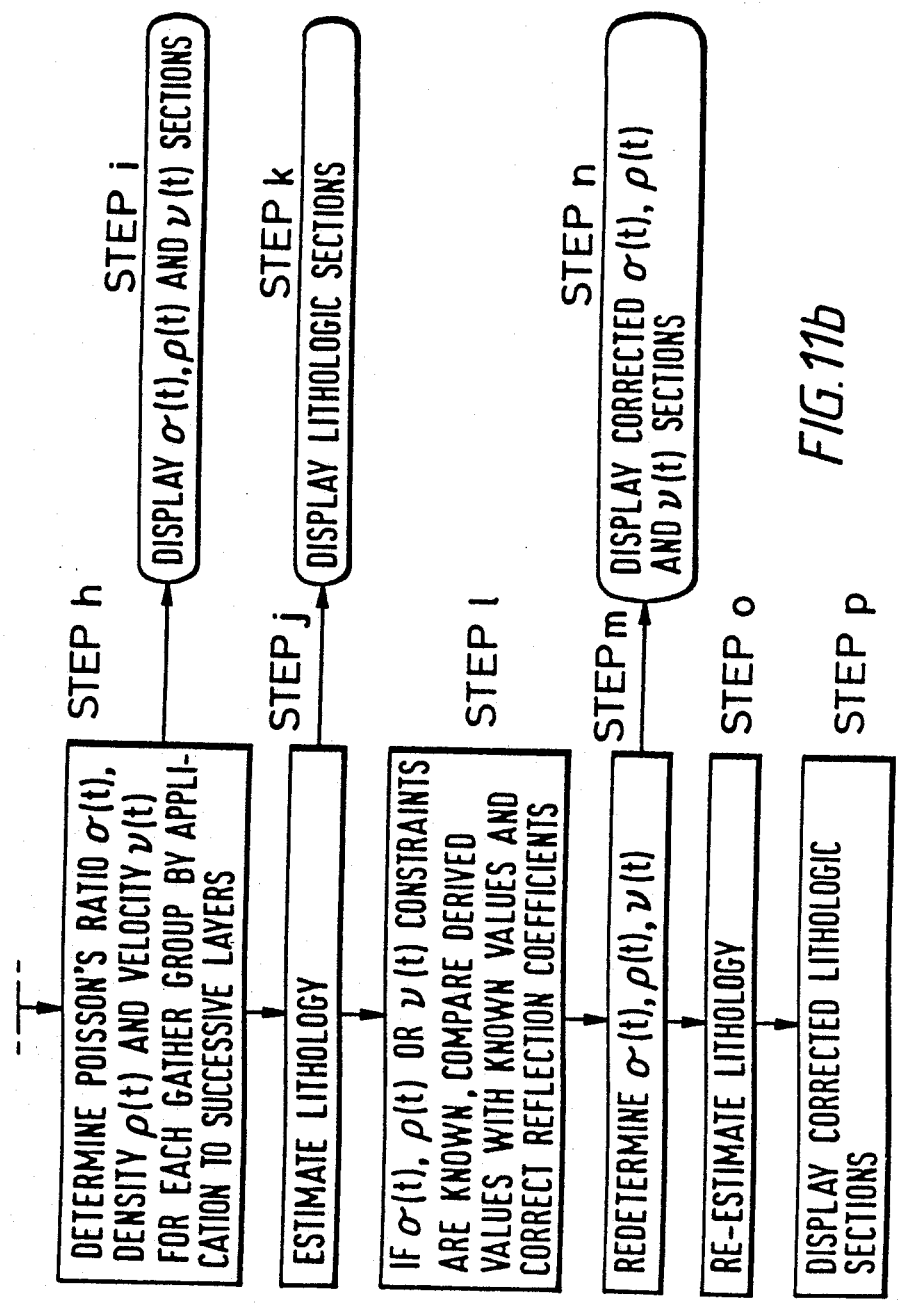
FIG. 11 shows a flow chart of the processes of the preferred embodiment of the invention. Variations are possible; for instance, step g can precede or be integrated into c.
Figure 12:
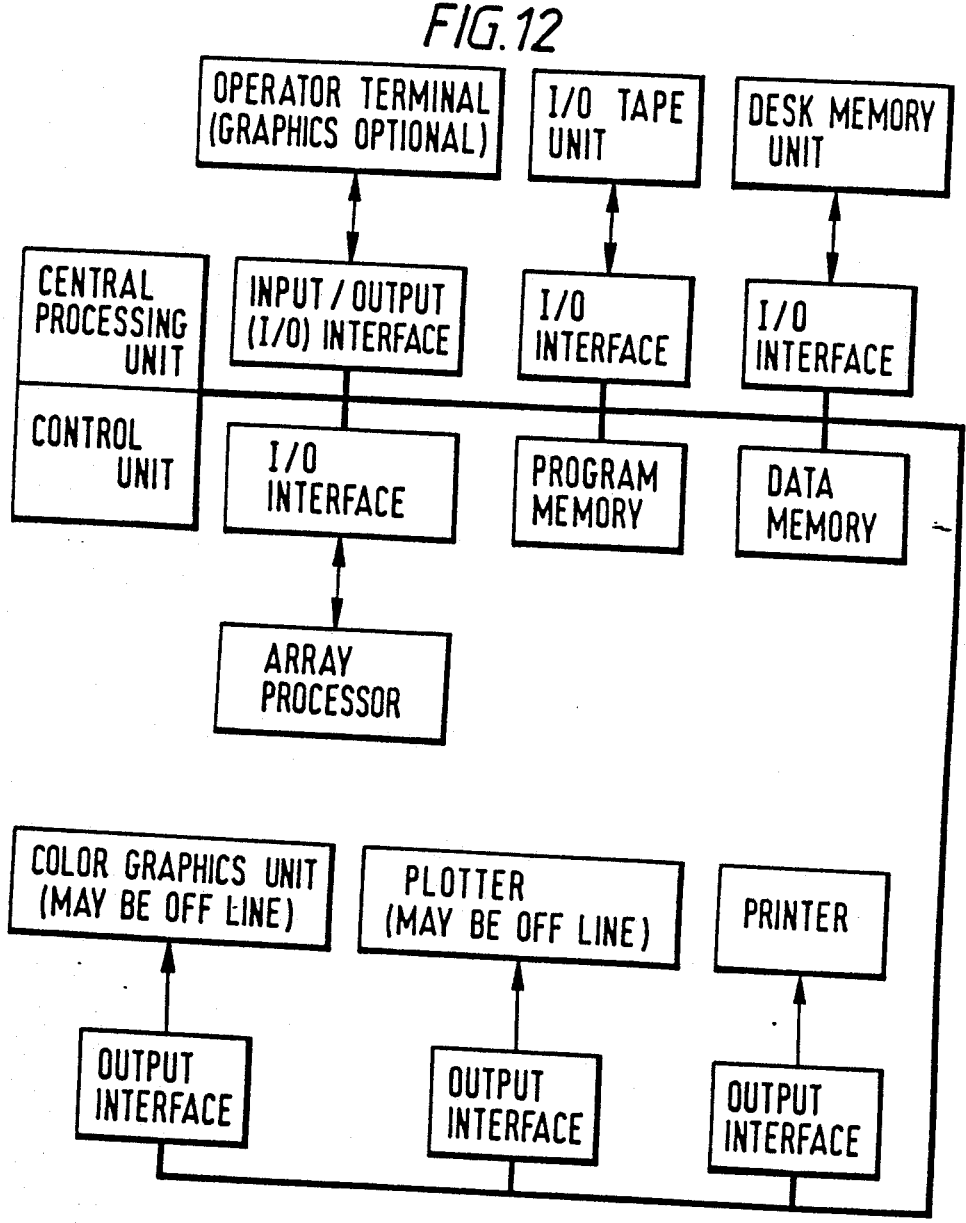
FIG. 12 shows a simplified diagram of a typical seismic data processing system.
Figure 13:
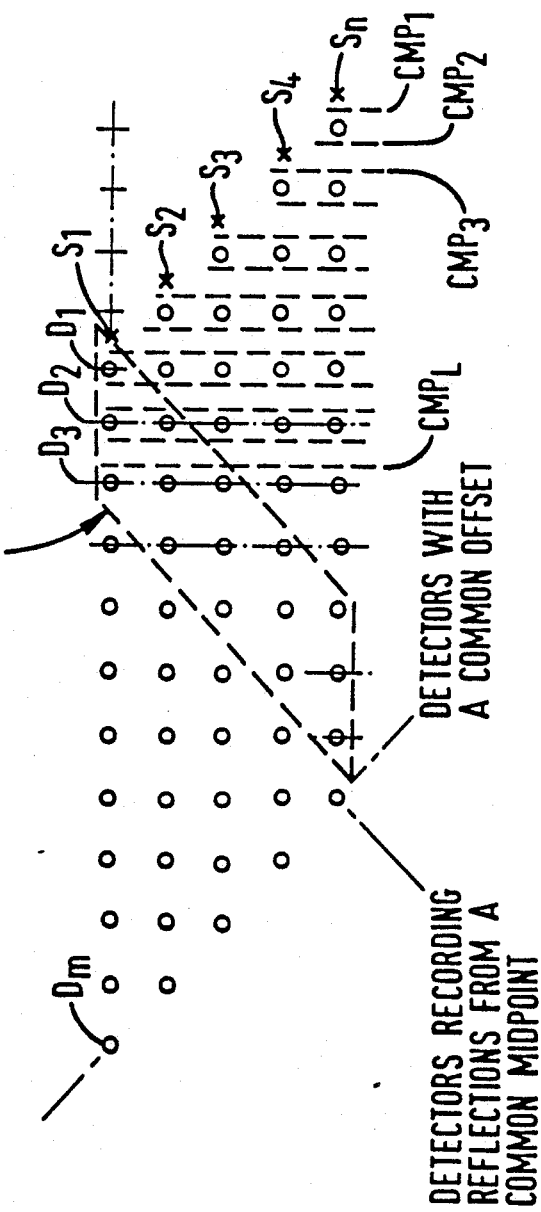
FIG. 13 shows a typical stacking diagram for common midpoint recorded seismic data.

FIG. 11 shows a flow chart of the subprocesses that together establish a total process under the preferred embodiment of the invention. The discussion that follows will explain the elements of FIG. 11 in terms of the definitions, background and theoretical developments that have preceded this discussion. A fully programmed computer system such as that depicted in FIG. 12 is helpful. Also, approximations to some lithological parameters, especially velocity and density, in one layer beneath a common midpoint may be helpful. Such approximations permit the process to determine the lithological parameters of an adjacent layer without beginning at the top layer, and also serve as a check on the process of determining the lithological parameters from the power series or orthogonal polynomial functions. The approximations can be obtained from well control data collected by methods known in the industry, such as by placing a seismic source and detector in a well to determine the seismic velocity over a short distance in the layer of placement. Approximations may also be obtained by using as a starting point the apparent average velocities of a seismic wave through the interfaces in question. Published velocity versus density relationships enable the seismologist to use these velocity approximations to obtain density approximations.

The process of the preferred embodiment of the invention begins with seismic multiple point data which has been acquired so that the common midpoints either lie along a line or are distributed over an area. In the case of the line acquisition procedure, the data are acquired in an "end on" fashion wherein the seismic signals from a source at S1 are received at detectors D1, D2... Dm, and associated with each recorded trace at D1, D2... Dm is a common midpoint at CMP1, CMP2. . . CMPL. The source is then moved by an amount equal to an integral multiple of detector separations. The detector array either will be moved an equivalent distance in the same direction or will be reconnected to the recording device in such a way as to produce a detector array which appears to have been moved. The later procedure is known as a "roll along" procedure in the art. The source will then be reexcited and the seismic signals generated will be recorded in the repositioned or simulated repositioned detector array, with a new corresponding midpoint associated with each trace. Midpoints from the second (and subsequent relocated excitations) will lie in the same physical location as midpoints from prior excitations but will be associated with a different offset.

The stacking diagram in FIG. 12 shows the relationships among the sources, detectors and common midpoints for a line acquisition procedure. The succession of common midpoints are each associated with traces from a progression of offsets. All the detector points that align vertically have the same common ground location. All the points which align diagonally up to the left represent traces with the same offset. The points which align horizontally represent traces recorded from a common source excitation. All detector points that align diagonally up to the right represent detectors recording reflections from the same common midpoint. The data that comes from the field will be grouped according to common source. Each group of traces corresponding to a common source excitation is referred to as a field record. The common midpoint technique and stacking diagrams are known in the industry and are further described in U.S. Pat. No. 4,316,268, Ostrander, for Method for Interpretation of Seismic Records to Yield Indication of Gaseous Hydrocarbons, the contents of which pertaining to common midpoint data collection are hereby incorporated by reference.

The next step, illustrated in b of FIG. 11, is the sorting procedure wherein traces from the whole set of field records are sorted into groups with common midpoints, called common midpoint gathers. The common midpoint gathers are represented by the lines diagionally up to the right in FIG. 12. Each trace is also identified with respect to detector location, source location and source-detector offset.

The next step (c in FIG. 11) involves static and dynamic data corrections known in the industry to compensate for time delays in the data and other known irregularities. For example, corrections can be made for the effects of spherical divergence of the seismic wave produced by the source, the progressive loss of seismic energy with consequent heating of the transmitting medium as the wave propagates, the directivity variations of the source and the receiver, effects caused by the free surface, and the portion of the arrival time representing horizontal rather than vertical travel of the seismic wave (called moveout). After making the necessary corrections, the data in each common midpoint gather will represent the reflectivity of the geological layer succession beneath such midpoint at the sequence of offsets sampled as a function of the offset.

Step d of FIG. 11 represents further grouping of two or more adjacent corrected common midpoint gathers into gather groups in order to improve signal-to-noise ratios by averaging out noise. The dashed parallelogram in the stacking diagram of FIG. 12 illustrates the data included in a gather group encompassing three common midpoint gathers, made up of a gather and the two gathers adjacent on each side. The number of common midpoint gathers in a gather group may be only one in good signal to noise ratio areas (and therefore this step would be omitted) and may be increased as the data quality decreases. A gather group with four common midpoint gathers will theoretically yield a signal-to-noise ratio better than a gather group with just one common midpoint gather, although some precision may be sacrificed because the gather groups blend data from adjacent locations. Computer programs to accomplish gather groupings are standard features of many data processing packages available in the industry.

In step e of FIG. 11, the reflection coefficients for each gather group are expressed as mathematical functions of the offsets for successive time indexes (which corresponds to successive depths) in each gather group. The most direct procedure is to use the method of least squares with the data at each time index in accordance with Equation (7a) to define the set $a0(t)$, $a2(t)$ and $a4(t)$ that best fits the sorted and corrected data. An alternate procedure is to fit the data set with a series of orthonormal polynomials, expressing reflection coefficients as functions of offset. (Orthonormal polynomials are approximating functions, the value of the coefficients of which are independent of the number of terms in the series.) A method for orthonormal polynomial approximations is described in Elementary Numerical Analysis. §6.3, Samuel D. Conte and Carl deBoor (1980), which is incorporated herein by reference. Power series expansion of the orthonormal polynomials will then yield the set $a0(t)$, $a2(t)$, $a4(t)$ and the coefficients of any additional terms in the power series retained for further precision. These least squares and orthonormal polynomial fits are achieved materially faster if the computer system employs an array processor so that numerous similar computations can be carried out simultaneously.

In an alternate embodiment of the invention, the static and dynamic corrections of step c in FIG. 11 omit any correction for moveout. The resulting corrected data in each common midpoint gather will represent the reflectivity of the geological layer succession beneath such midpoint at the sequence of offsets sampled, unadjusted for the moveout time lag. Then the mathematical fitting of step e is done along a moveout trajectory to associate the coefficient set, or the actual reflection coefficients obtained as described below, with successive moveout or offset values.

In optional step f of FIG. 11, selected coefficients or combinations of coefficients for a common midpoint may be plotted as a trace adjacent to such trace from the prior common midpoint, and so on to form a parameter trace seismic section. Digital plotters commonly used in the industry are helpful for performing this step.

Special attention should be addressed to the $a0(t)$ coefficient trace section. Reference to the theoretical background portion of this application shows that the $a0(t)$ section is the normal incidence (zero angle of incidence) reflectivity section. Because reflectivity varies with angle of incidence, and angles of incidence vary at each interface as a wave descends through the layers, the normal stacked seismic section indicates reflectivity variances that may result from angle of incidence variances rather than from lithological variances. The $a0(t)$ parameter section is superior because the angle of incidence variation has been taken into account. Thus, it is better than a normal stacked section for inferring variations in normal incidence reflectivity and for correlating seismic reflectors from common midpoint to common midpoint.

Figure 14A:
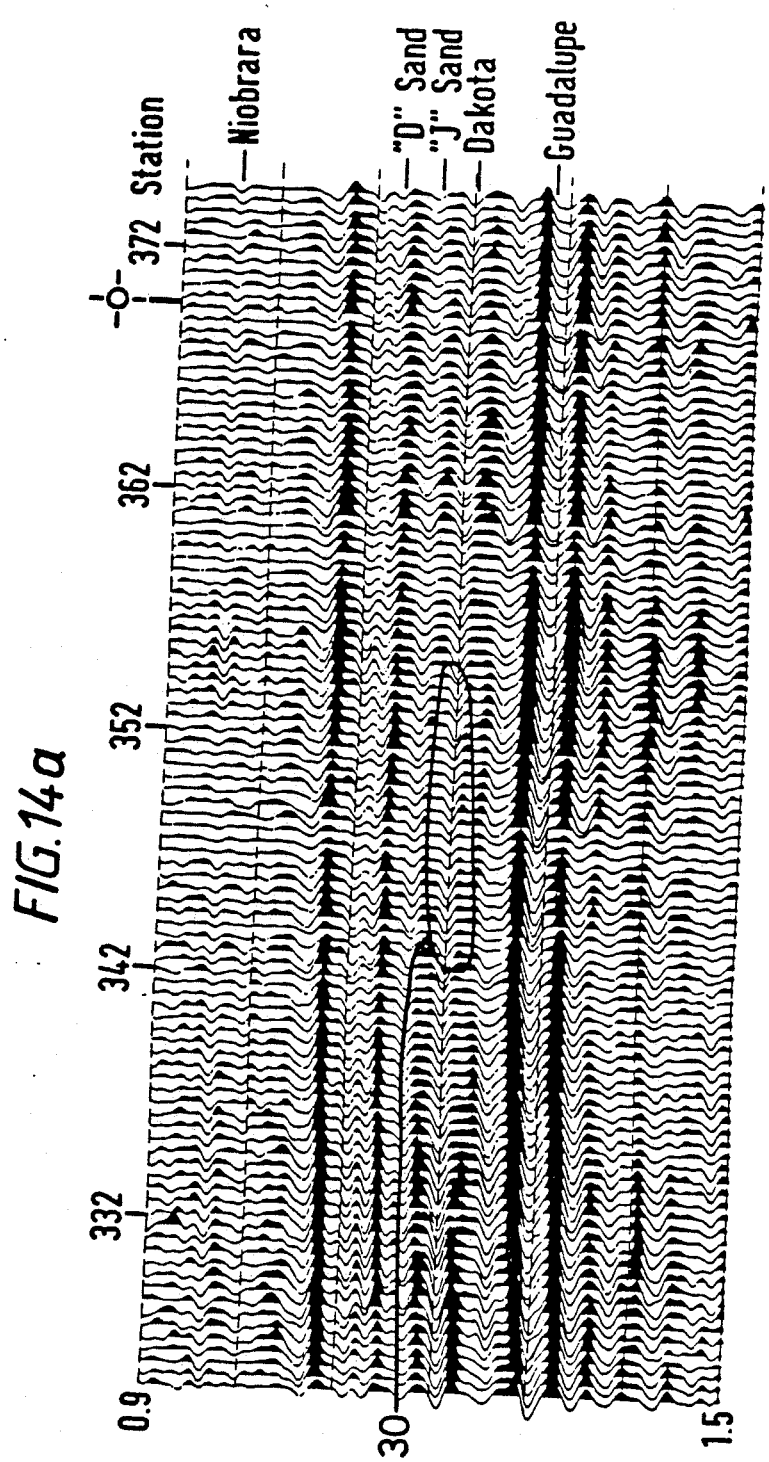
FIGS. 14a and 14b illustrate a comparison between a normal stacked section and an a0 section (normal incidence section).
Figure 14B:
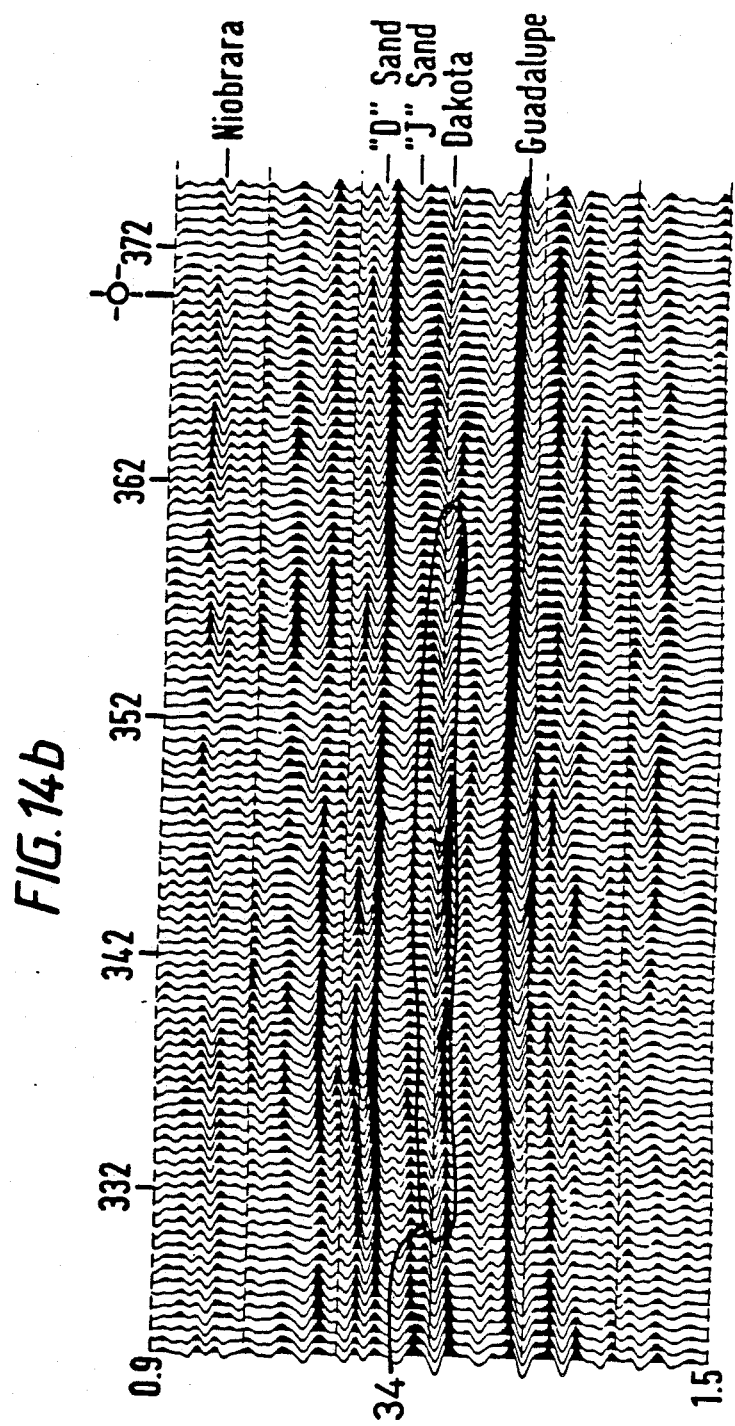

FIG. 14 illustrates a portion of a normal stacked (zero offset) seismic section and an $a0(t)$ parameter section derived from the same seismic data. A stratum 30 shows an unresolved channel sand in the conventional normal stacked section of FIG. 14a. The same stratum 34 is shown in FIG. 14b with much better resolution and interpretive value to those skilled in the art.

Figure 8:
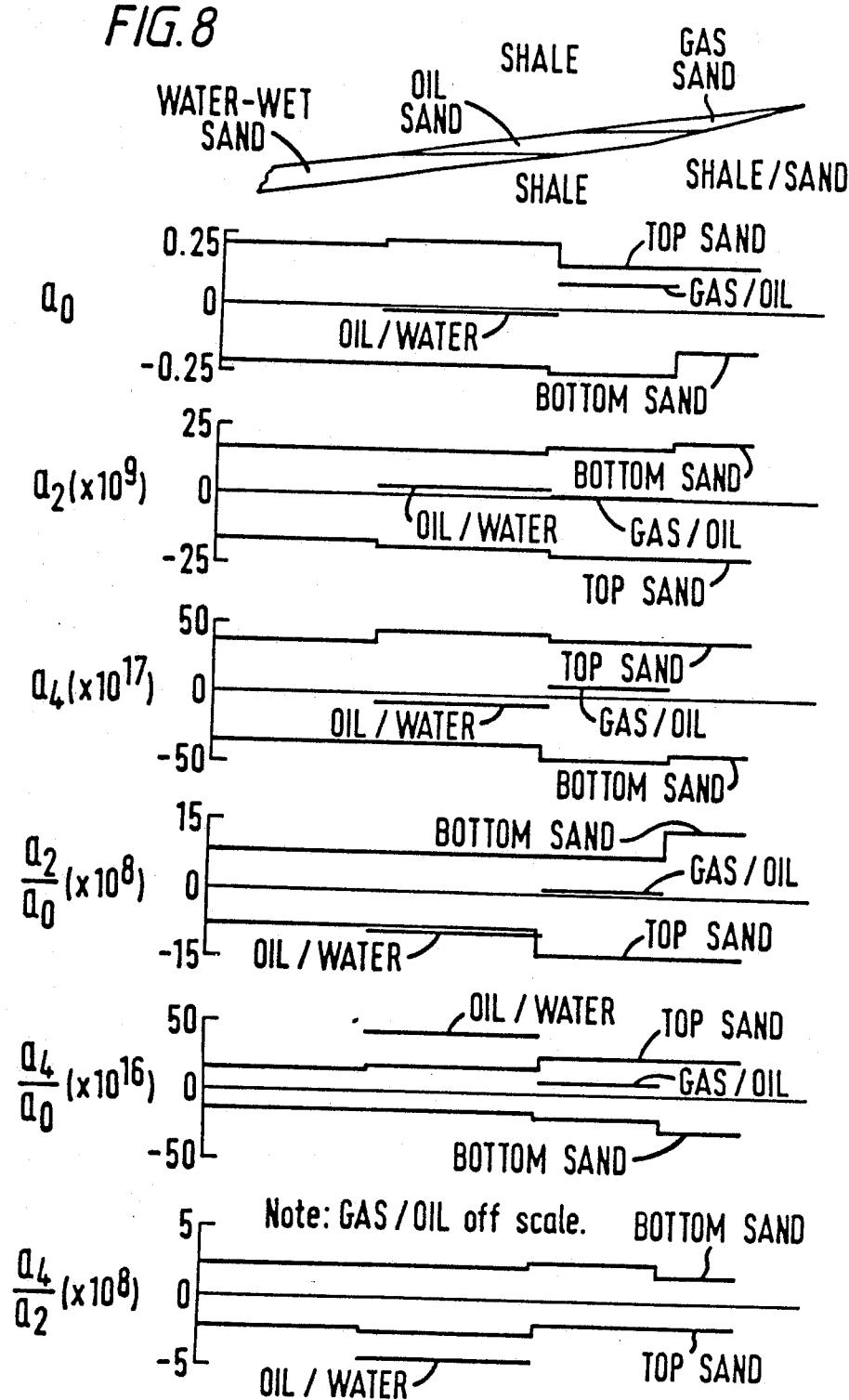
FIG. 8 shows the invention's calculated lateral response to a consolidated sandstone hydrocarbon reservoir with respect to several lithological parameter coefficients.

Other coefficient trace sections such as $a2(t)$, $a4(t)$, $a2(t)/a0(t)$ and $a4(t)/a0(t)$ may also prove valuable in identifying geological layers as practitioners develop interpretive abilities. Trace sections for several coefficients are shown in FIG. 8.

Figure 15A:
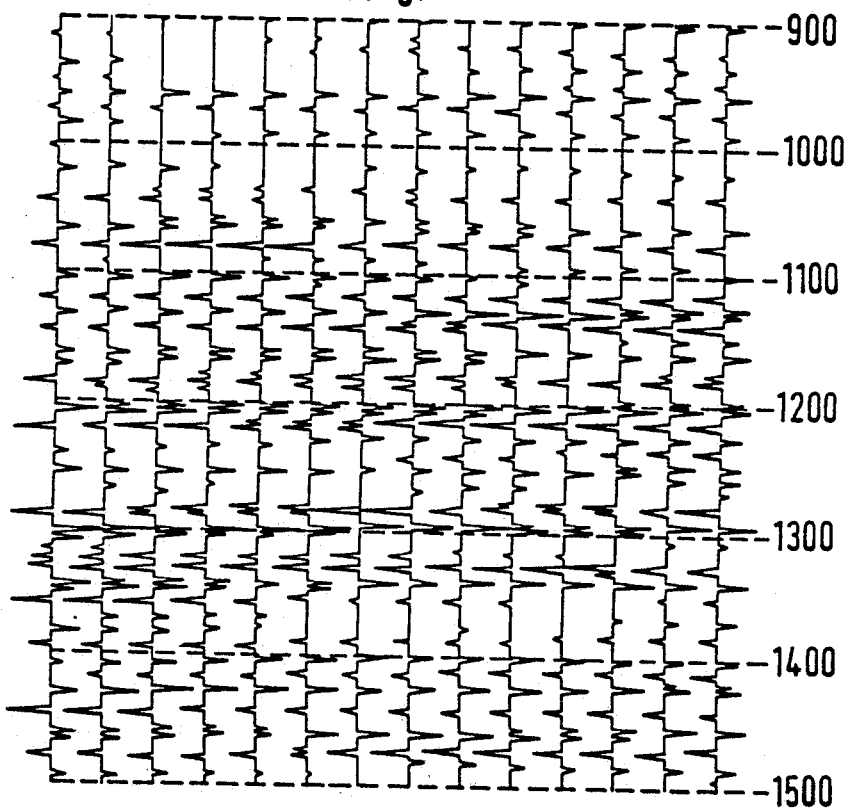
FIGS. 15a through 15c show the r0, r2 and r4 reflection coefficient spike series derived from the a0, a2 and a4 fit traces.
Figure 15B:
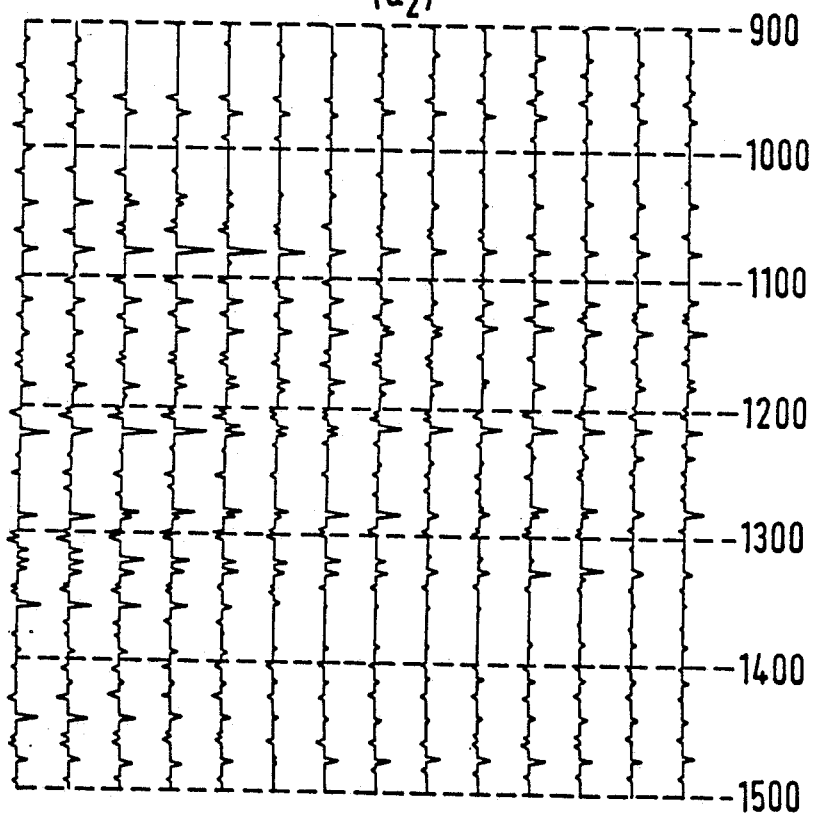
Figure 15C:
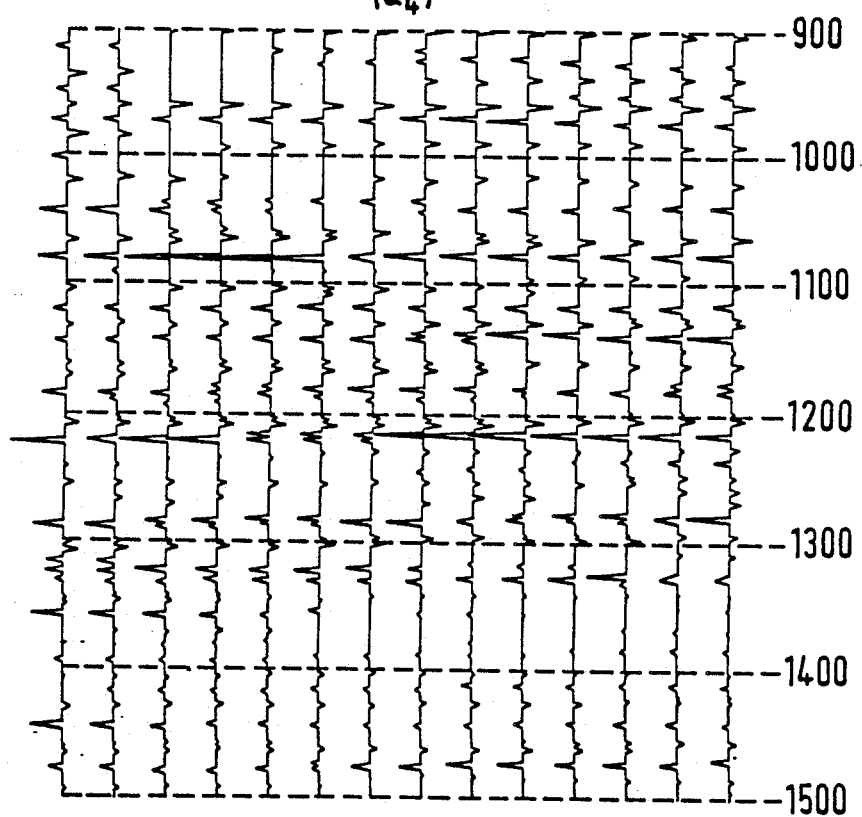

The next step (g in FIG. 11) is to derive the effective reflection coefficient "spikes" $r0(t)$, $r2(t)$ and $r4(4)$ for the layer series from the $a0(t)$, $a2(t)$ and $a4(t)$ traces respectively using algorithms designed specifically for that purpose. In theory, a trace section of reflection coefficients should show spikes at each reflecting interface, corresponding to a reflection at that interface. The trace section should show zero values between reflecting interfaces, corresponding to zero reflection between the reflecting interfaces. In practice, however, the statically and dynamically corrected reflection coefficient trace section appears to show reflections between the interfaces. These apparent reflections are because the seismic wave is not an impulse when it reflected from an interface or when it is detected by the detector. Instead, the wave amplitude varies over time as a result of the frequency of the seismic source and the filtering of the wave through the earth. The process of deriving the reflection coefficient spike series from the apparent traces is called "deconvolution" or the process of "deconvolving." Algorithms for this purpose are known in the art and are described in Oldenberg, et al (1983) and Walker and Ulrych (1983). A sample reflection coefficient spike series r0, r2 and r4 are shown in FIGS. 15a, 15b and 15c, respectively.

The changes in velocity, density and Poisson's ratio can then be determined for successive time indices in each common midpoint using equations 9a, 9b and 9c. At this point, refined estimates of velocity, density and Poisson's ratio may be determined and displayed by comparing the initial values with locally known values that may be available and then generating corrections to the $a0(t)$, $a2(t)$, $a4(t)$ constants. This procedure is illustrated in h through p of FIG. 11.

Figure 16:
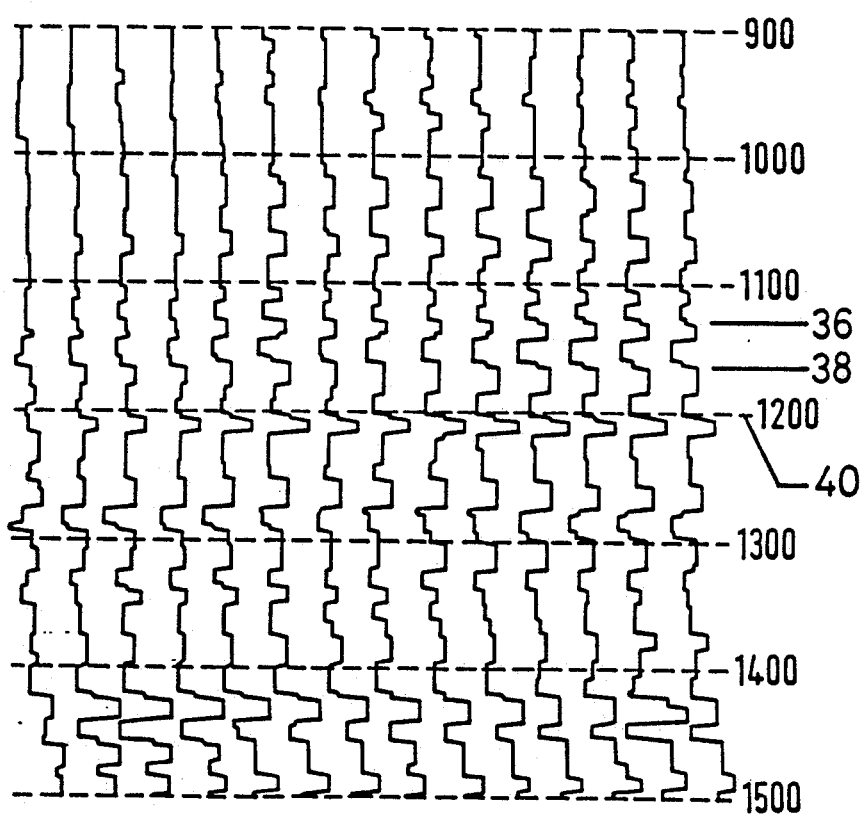
FIGS. 16 through 18 show velocity, density and Poisson's ratio profiles derived from the r0, r2 and r4 reflection coefficient spike series, one set of which is illustrated in FIG. 15.
Figure 17:
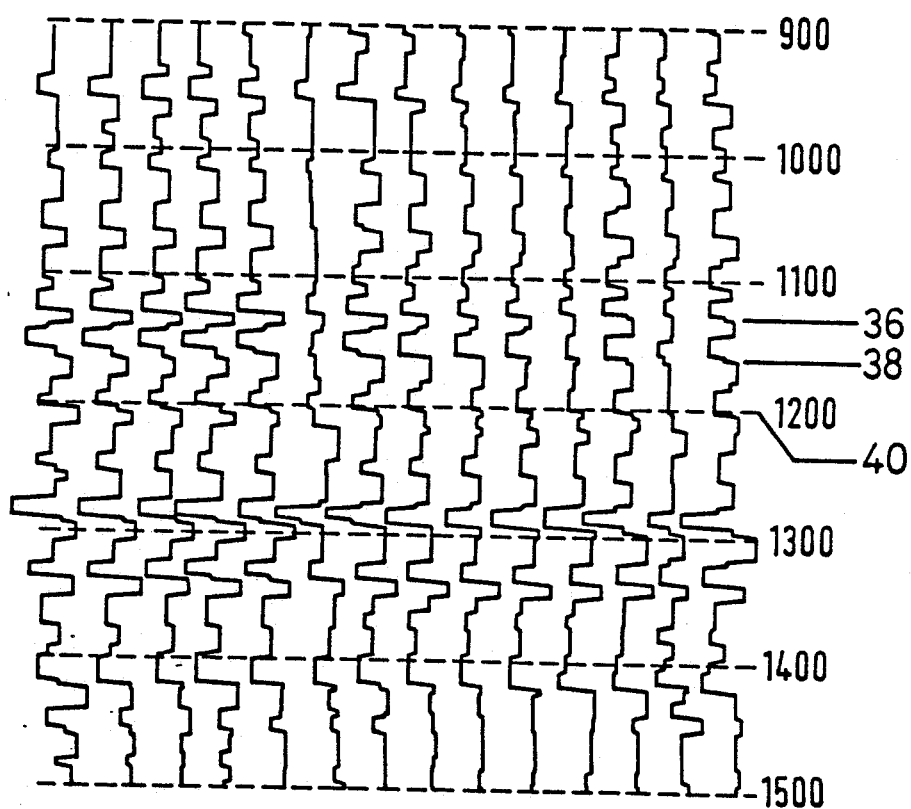
Figure 18:
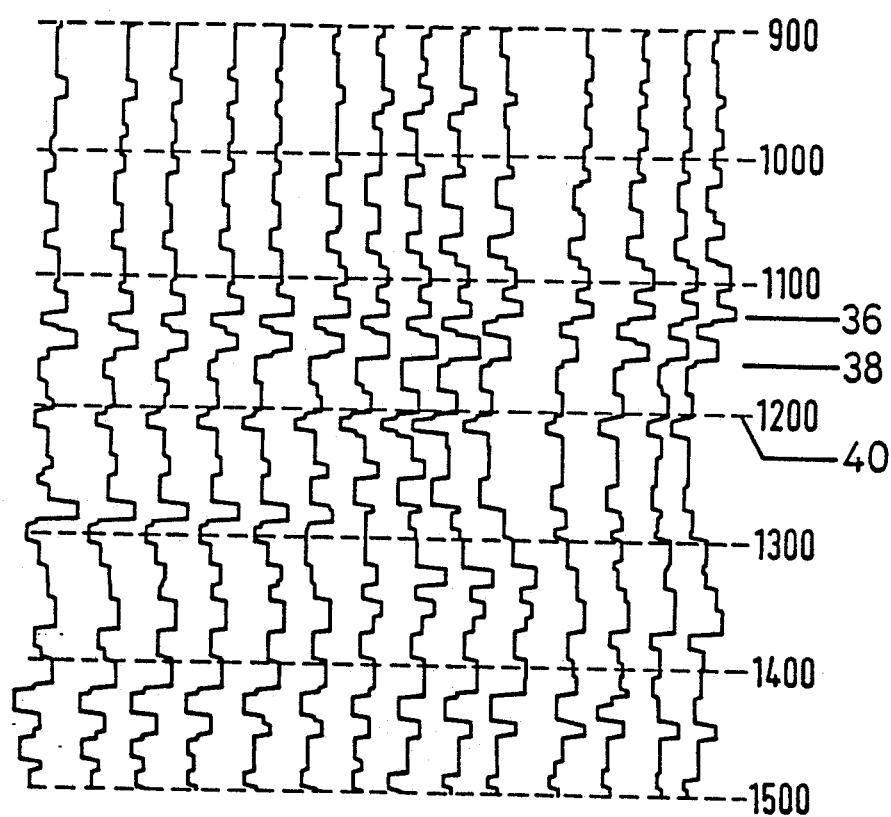

FIGS. 16, 17 and 18 illustrate the velocity, density and Poisson's ratio profile estimates, respectively, derived from the data of FIG. 15. Several important stata 36, 38 and 40 on FIGS. 16–18 will be apparent to those skilled in interpreting seismic sections. Statum 36 is the top of a sand layer called "D" sand. Statum 38 is the top of another sand layer called "J" sand. Statum 40 is the top of another sand layer called "Dakota" sand.

Figure 9:
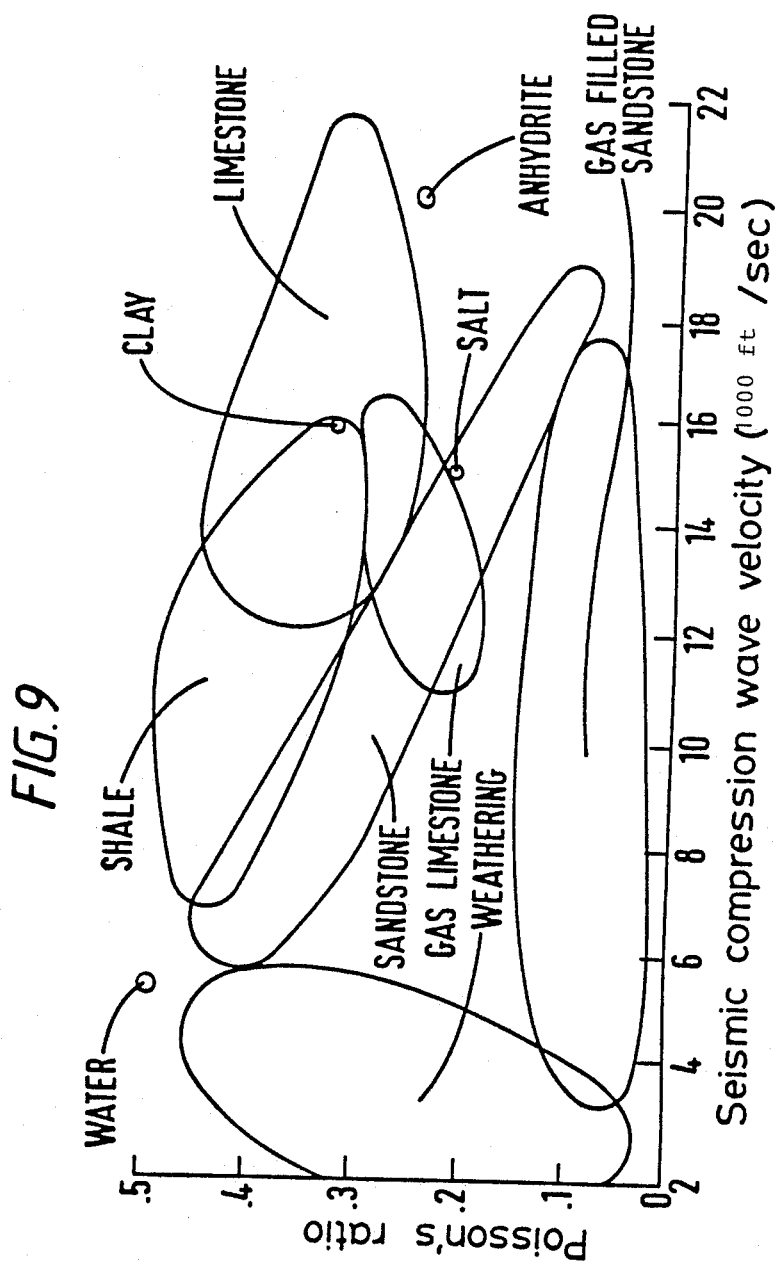
Figure 19:
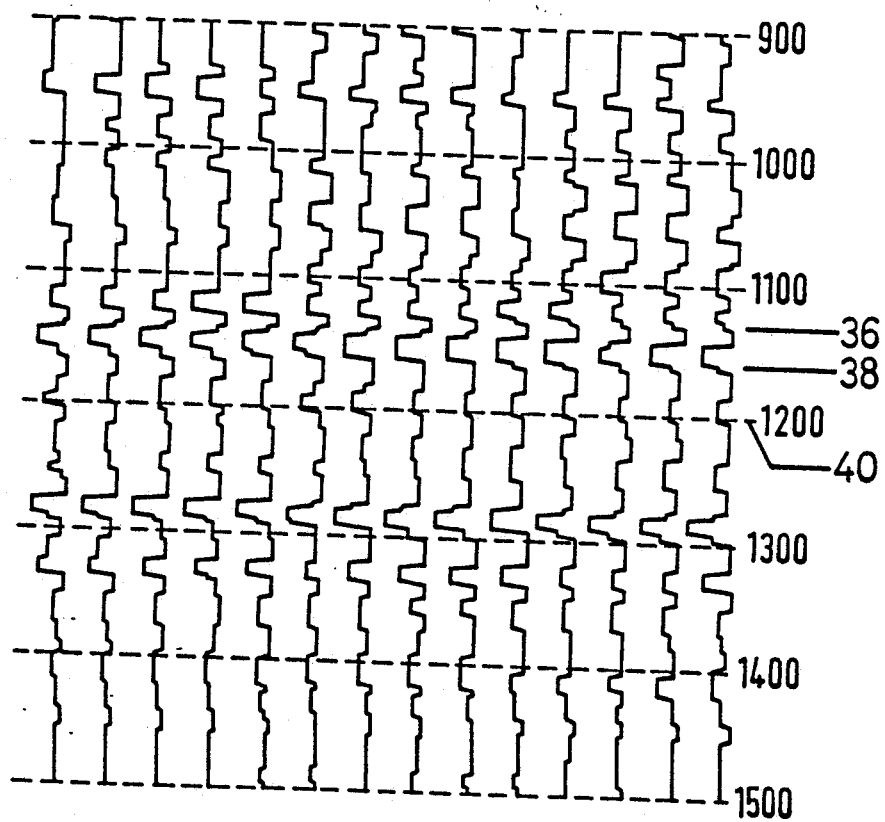
FIG. 19 shows the results of automated lithologic interpretation wherein the results illustrated in FIGS. 15 through 18 were interpreted in terms of the rules illustrated in FIGS. 9 and 10.

The final steps require data relating the velocity, density and Poisson's ratio of each layer, determined as described above, to the lithology and pore content of such layers. A number of publications show these relationships for a wide range of lithological types, typically in the form of charts like those shown in FIGS. 9 and 10. Using those relationships a lithologic section, illustrated in FIG. 19, can be generated. The FIG. 19 section was generated by assigning trace magnitudes to various areas on a chart of seismic wave velocity and Poisson's ratio (such as the chart shown in FIG. 9). The same result could be achieved by assigning different colors rather than different magnitudes to the areas. FIG. 19 distinctly shows the same stata 36, 38 and 40 as shown in the velocity, density and Poisson's ratio sections of FIGS. 16–18.

The method of the invention provides the explorationist with a powerful tool for delineating hydrocarbon reservoirs and ascertaining hydrocarbon reservoir pore content. The invention is not limited to any specific embodiments or any specific formulation, as variations are readily apparent.

What is claimed is:

1. A method to determine lithology or fluid or gas content of strata, comprising the steps of:
   (a) positioning and employing a plurality of seismic wave source-detector pairs having different offsets and one common horizontal midpoint;
   (b) generating seismic waves with said sources, and detecting and recording the amplitudes of seismic waves reflected by discontinuities in the lithological parameters of said strata, for each source-detector pair;
   (c) relating said different offsets to variations in said amplitudes using mathematical equations containing at least one lithological parameter of two or more adjacent strata and said amplitudes and offsets;
   (d) deconvolving the amplitudes into reflection coefficient spikes for said strata;
   (e) determining the value of any of the lithological parameters of one or more strata successively through said mathematical equations by knowledge of the value of lithological parameters of an adjacent strata; and
   (f) predicting the composition of the strata for which the value of a lithological parameter has been determined by comparison of said value with known values for known compositions.

2. The method of claim 1, further comprising the step of:
   (a) generating visual displays of the determined value of any of the lithological parameters.

3. A method to determine lithology or fluid or gas content of strata, comprising the steps of:
   (a) positioning and employing a plurality of seismic wave source-detector pairs having different offsets and one common horizontal midpoint;
   (b) generating seismic waves with said sources, and detecting and recording the amplitudes of seismic waves reflected by discontinuities in the lithological parameters of said strata, for each source-detector pair;
   (c) correcting said amplitudes for known irregularities, without a moveout correction;
   (d) relating said different offsets to variations in said amplitudes using mathematical equations containing at least one lithological parameter of two or more adjacent strata and said corrected amplitudes and offsets along a moveout trajectory and relating the results to reflection time to obtain reflection coefficient traces from a give reflecting interface associated with one another at successive offsets.
   (e) deconvolving the corrected amplitudes into reflection coefficient spikes for said strata,
   (f) determining the value of any of the lithological parameters of one or more strata successively through said mathematical equations by knowledge of the value of lithological parameters of an adjacent strata; and
   (g) predicting the composition of the strata for which the value of a lithological parameter has been determined by comparison of said value with known values for known compositions.

4. The method of claim 3, further comprising the step of:
   (a) generating visual displays of the determined value of any of the lithological parameters.

5. A method to determine lithology or fluid or gas content of strata, comprising the steps of:
   (a) positioning and employing a plurality of seismic wave source-detector pairs having different offsets and one common horizontal midpoint;
   (b) generating seismic waves with said sources, and detecting and recording the amplitudes of seismic waves reflected by discontinuities in the lithological parameters of said strata, for each source-detector pair;
   (c) correcting said amplitudes for known irregularities;
   (d) relating said different offsets to variations in said amplitudes using mathematical equations containing at least one lithological parameter of two or more adjacent strata and said corrected amplitudes and offsets; and
   (e) generating visual displays of the lithological parameter coefficients.

6. The method of claims 1, 2, 3, 4 or 5 in which any of said steps are performed by automated processing means.

7. The method of claim 6 in which said mathematical functions are functions from which power series functions may be extracted.

8. The method of claim 6 in which said lithological parameters include Poisson's ratio.

* * * * *